(12) United States Patent
Teicher

(10) Patent No.: US 8,224,990 B2
(45) Date of Patent: Jul. 17, 2012

(54) METHOD AND APPARATUS FOR MANAGING INTERPERSONAL ACTIVITIES

(76) Inventor: Mordechai Teicher, Hod Hasharon (IL)

( * ) Notice: Subject to any disclaimer, the term of this patent is extended or adjusted under 35 U.S.C. 154(b) by 0 days.

(21) Appl. No.: 12/910,784

(22) Filed: Oct. 23, 2010

(65) Prior Publication Data

US 2011/0035385 A1 Feb. 10, 2011

Related U.S. Application Data

(63) Continuation of application No. 11/925,979, filed on Oct. 28, 2007, now Pat. No. 7,849,212, which is a continuation of application No. 10/841,268, filed on May 7, 2004, now Pat. No. 7,305,398.

(60) Provisional application No. 60/496,242, filed on Aug. 15, 2003, provisional application No. 60/479,007, filed on Jun. 15, 2003.

(51) Int. Cl.
*G06F 15/173* (2006.01)

(52) U.S. Cl. ........ 709/238; 709/204; 709/207; 455/41.2

(58) Field of Classification Search ........... 709/238
See application file for complete search history.

(56) References Cited

U.S. PATENT DOCUMENTS

| | | | | | |
|---|---|---|---|---|---|
| 5,796,395 | A | * | 8/1998 | de Hond | 715/751 |
| 5,920,845 | A | * | 7/1999 | Risemberg | 705/319 |
| 6,058,367 | A | * | 5/2000 | Sutcliffe et al. | 705/7.29 |
| 6,061,681 | A | * | 5/2000 | Collins | 1/1 |
| 6,272,467 | B1 | * | 8/2001 | Durand et al. | 705/5 |
| 6,311,178 | B1 | | 10/2001 | Bi et al. | |
| 6,480,885 | B1 | * | 11/2002 | Olivier | 709/207 |
| 6,549,768 | B1 | * | 4/2003 | Fraccaroli | 455/456.3 |
| 6,641,481 | B1 | * | 11/2003 | Mai et al. | 463/42 |
| 6,676,521 | B1 | * | 1/2004 | La Mura et al. | 463/42 |
| 7,085,806 | B1 | * | 8/2006 | Shapira | 709/203 |
| 7,092,952 | B1 | * | 8/2006 | Wilens | 1/1 |
| 7,613,706 | B2 | * | 11/2009 | Terrill et al. | 1/1 |
| 2001/0033640 | A1 | * | 10/2001 | Wuelly | 379/88.18 |
| 2001/0044339 | A1 | * | 11/2001 | Cordero et al. | 463/42 |
| 2001/0047290 | A1 | * | 11/2001 | Petras et al. | 705/10 |
| 2002/0090911 | A1 | * | 7/2002 | Evans et al. | 455/41 |
| 2002/0103792 | A1 | * | 8/2002 | Blank et al. | 707/3 |
| 2002/0116458 | A1 | * | 8/2002 | Bricklin et al. | 709/204 |
| 2003/0087652 | A1 | * | 5/2003 | Simon et al. | 455/466 |
| 2003/0191673 | A1 | * | 10/2003 | Cohen | 705/5 |
| 2004/0009816 | A1 | * | 1/2004 | Miller | 463/42 |
| 2004/0023666 | A1 | * | 2/2004 | Moon et al. | 455/456.1 |

FOREIGN PATENT DOCUMENTS

WO 02080038 10/2002

* cited by examiner

*Primary Examiner* — Firmin Backer
*Assistant Examiner* — Hamza Algibhah

(57) ABSTRACT

An apparatus and method for managing interpersonal activities among subscribers. A processor picks two subscribers for a meeting, and assigns them matched face-to-face or virtual assignments that are either identical or complementary. Assignments are selected by a processor according to preferences previously received from the picked subscribers. A random factor may affect the assignment selection. The level of intensity and/or intimacy of assignments selected by the processor may be responsive to the number of previous meetings of the picked subscribers.

20 Claims, 12 Drawing Sheets

| ASSIGNMENT: | A | B | C | D | E | F | G | H |
|---|---|---|---|---|---|---|---|---|
| MARY | 0 | 0 | 9 | 3 | 4 | 4 | 2 | 6 |
| ANNA | 9 | 5 | 5 | 5 | 0 | 0 | 0 | 0 |
| RACHEL | 3 | 9 | 8 | 8 | 5 | 0 | 4 | 8 |
| SUZY | 8 | 0 | 0 | 4 | 4 | 6 | 9 | 3 |
| PETER | 0 | 0 | 0 | 0 | 9 | 0 | 1 | 1 |
| PAUL | 7 | 5 | 1 | 9 | 3 | 5 | 5 | 1 |
| JOHN | 7 | 6 | 3 | 0 | 0 | 8 | 0 | 5 |
| JIM | 3 | 0 | 0 | 9 | 8 | 3 | 3 | 1 |

330

| ASSIGNMENT: | A | B | C | D | E | F | G | H |
|---|---|---|---|---|---|---|---|---|
| MARY & PETER | 0 | 0 | 0 | 0 | 13 | 0 | 3 | 7 |
| MARY & PAUL | 0 | 0 | 10 | 12 | 7 | 9 | 7 | 7 |
| MARY & JOHN | 0 | 0 | 12 | 0 | 0 | 12 | 0 | 11 |
| MARY & JIM | 0 | 0 | 0 | 12 | 12 | 7 | 5 | 7 |
| ANNA & PETER | 0 | 0 | 0 | 0 | 0 | 0 | 0 | 0 |
| ANNA & PAUL | 16 | 10 | 6 | 14 | 0 | 0 | 0 | 0 |
| ANNA & JOHN | 16 | 11 | 8 | 0 | 0 | 0 | 0 | 0 |
| ANNA & JIM | 12 | 0 | 0 | 14 | 0 | 0 | 0 | 0 |
| RACHEL & PETER | 0 | 0 | 0 | 0 | 14 | 0 | 5 | 9 |
| RACHEL & PAUL | 10 | 14 | 9 | 17 | 8 | 0 | 9 | 9 |
| RACHEL & JOHN | 10 | 15 | 11 | 0 | 0 | 0 | 0 | 13 |
| RACHEL & JIM | 6 | 0 | 0 | 17 | 13 | 0 | 7 | 9 |
| SUZY & PETER | 0 | 0 | 0 | 0 | 13 | 0 | 10 | 4 |
| SUZY & PAUL | 15 | 0 | 0 | 13 | 7 | 11 | 14 | 4 |
| SUZY & JOHN | 15 | 0 | 0 | 0 | 0 | 14 | 0 | 8 |
| SUZY & JIM | 11 | 0 | 0 | 13 | 12 | 9 | 12 | 4 |

340

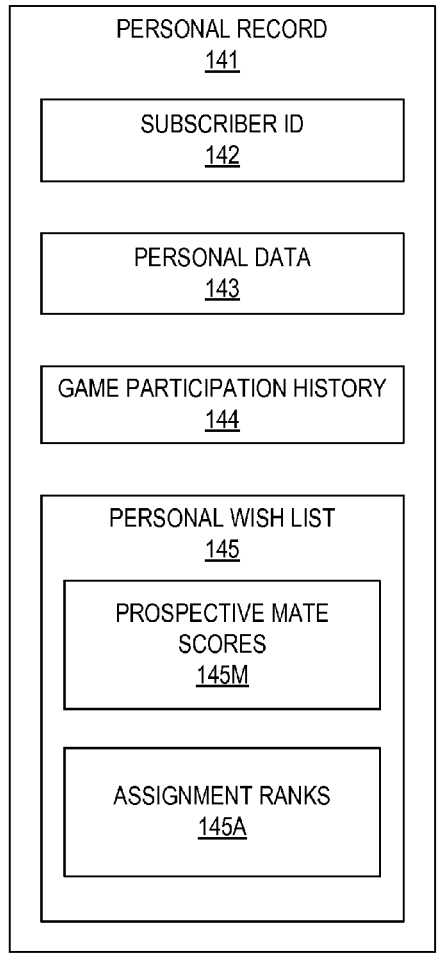
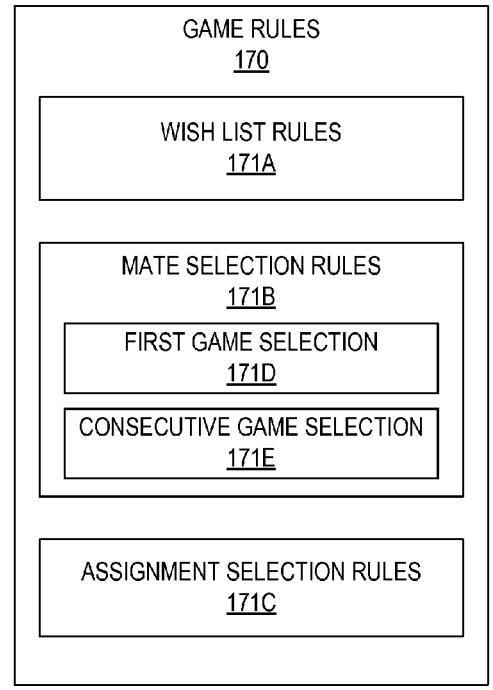
FIG. 4
FIG. 5
FIG. 4B
FIG. 4A
FIG. 4C

*330*

| ASSIGNMENT: | A | B | C | D | E | F | G | H |
|---|---|---|---|---|---|---|---|---|
| MARY | 0 | 0 | 9 | 3 | 4 | 4 | 2 | 6 |
| ANNA | 9 | 5 | 5 | 5 | 0 | 0 | 0 | 0 |
| RACHEL | 3 | 9 | 8 | 8 | 5 | 0 | 4 | 8 |
| SUZY | 8 | 0 | 0 | 4 | 4 | 6 | 9 | 3 |
| PETER | 0 | 0 | 0 | 0 | 9 | 0 | 1 | 1 |
| PAUL | 7 | 5 | 1 | 9 | 3 | 5 | 5 | 1 |
| JOHN | 7 | 6 | 3 | 0 | 0 | 8 | 0 | 5 |
| JIM | 3 | 0 | 0 | 9 | 8 | 3 | 3 | 1 |

*340*

| ASSIGNMENT: | A | B | C | D | E | F | G | H |
|---|---|---|---|---|---|---|---|---|
| MARY & PETER | 0 | 0 | 0 | 0 | 13 | 0 | 3 | 7 |
| MARY & PAUL | 0 | 0 | 10 | 12 | 7 | 9 | 7 | 7 |
| MARY & JOHN | 0 | 0 | 12 | 0 | 0 | 12 | 0 | 11 |
| MARY & JIM | 0 | 0 | 0 | 12 | 12 | 7 | 5 | 7 |
| ANNA & PETER | 0 | 0 | 0 | 0 | 0 | 0 | 0 | 0 |
| ANNA & PAUL | 16 | 10 | 6 | 14 | 0 | 0 | 0 | 0 |
| ANNA & JOHN | 16 | 11 | 8 | 0 | 0 | 0 | 0 | 0 |
| ANNA & JIM | 12 | 0 | 0 | 14 | 0 | 0 | 0 | 0 |
| RACHEL & PETER | 0 | 0 | 0 | 0 | 14 | 0 | 5 | 9 |
| RACHEL & PAUL | 10 | 14 | 9 | 17 | 8 | 0 | 9 | 9 |
| RACHEL & JOHN | 10 | 15 | 11 | 0 | 0 | 0 | 0 | 13 |
| RACHEL & JIM | 6 | 0 | 0 | 17 | 13 | 0 | 7 | 9 |
| SUZY & PETER | 0 | 0 | 0 | 0 | 13 | 0 | 10 | 4 |
| SUZY & PAUL | 15 | 0 | 0 | 13 | 7 | 11 | 14 | 4 |
| SUZY & JOHN | 15 | 0 | 0 | 0 | 0 | 14 | 0 | 8 |
| SUZY & JIM | 11 | 0 | 0 | 13 | 12 | 9 | 12 | 4 |

FIG. 10A

METHOD AND APPARATUS FOR MANAGING INTERPERSONAL ACTIVITIES

CROSS-REFERENCE TO RELATED APPLICATIONS

This application is a continuation of U.S. patent application Ser. No. 11/925,979, entitled "METHOD FOR MANAGING SOCIAL GAMES" filed on Oct. 28, 2007; now U.S. Pat. No. 7,849,212 which in turn is a continuation of U.S. patent application Ser. No. 10/841,268, entitled "APPARATUS AND METHOD FOR MANAGING SOCIAL GAMES" filed on May 7, 2004, now U.S. Pat. No. 7,305,398; which claims the benefits of U.S. Provisional Patent Application No. 60/496,242, filed on Aug. 15, 2003 and U.S. Provisional Patent Application No. 60/479,007, filed Jun. 15, 2003.

This application is related to U.S. patent application Ser. No. 11/925,974 entitled "APPARATUS FOR MANAGING SOCIAL GAMES" filed on Oct. 28, 2007, now U.S. Pat. No. 7,769,699; U.S. patent application Ser. No. 11/344,816 entitled "METHOD AND APPARATUS FOR ARRANGING SOCIAL MEETINGS" filed on Feb. 1, 2006, now U.S. Pat. No. 7,761,386; U.S. patent application Ser. No. 11/345,084 entitled "METHOD AND APPARATUS FOR LEISURE & ENTERTAINMENT MERCHANDISING" filed on Feb. 1, 2006; and U.S. patent application Ser. No. 12/829,387 entitled: "METHOD AND APPARATUS FOR ARRANGING FACE-TO-FACE MEETINGS" filed on Jul. 2, 2010.

All applications of the two paragraphs above are incorporated herein by reference.

BACKGROUND OF THE INVENTION

1. Field of the Invention

The present invention relates to computer-aided social activities, and in particular to computer-aided interpersonal activities for matchmaking.

2. Description of Related Art

Men and women seek mates for companionship, falling in love, and establishing a happy family. Some are fortunate to obtain a suitable mate by happenstance, but many others experience difficulties and may be unsuccessful. The three main obstacles to obtaining a suitable mate are:

Not having enough opportunities for meeting eligible prospective mates;

Having opportunities for meeting eligible prospective mates, but making the wrong choices in mate selection;

Making a suitable choice of a prospective mate, but failing to initiate a relationship.

Many commercial and non-commercial initiatives for arranging singles meeting opportunities have promoted singles' parties, bars, cruises, weekends, trips, video introductions, Internet dating, mobile chats, blind dates, and so forth, all of which suffer from one or more of the following drawbacks:

Event attendees are judged principally by superficial first-impressions, which favor only a small minority of men and women; the great majority require a second look to appreciate. As a result, it often happens that relatively few attractive men and women become the prime target of the attendees of the opposite sex, leaving the majority of attendees ignored by one another.

One-on-one first meetings are often disappointing, leading to feelings of awkwardness. Often, the interest of one party may not be reciprocated, leading to embarrassing situations, where one party must reject the other. In some cases, the rejected party may continue to make annoying advances to the other.

Approaching and communicating with a stranger is embarrassing for many people, who are unable to appear at their best under such circumstances.

Women are sometimes offended by the way in which they are approached. Some women also find it difficult to approach men.

Even after a successful first date that created mutual interest for a second date, many people fail to further develop a mutual interest toward intimacy and love. This often happens in spite of having a true potential for becoming a successful couple.

Many innovators have proposed schemes for presorting singles according to predefined criteria, for introducing them to each other conveniently, and for facilitating the initial interaction, by using the Internet, cellular communication, or sophisticated matchmaking algorithms. Examples for such initiatives are included in PCT publication 00/62266 to Liberman et al.; U.S. Pat. No. 5,950,200 to Sudai et al.; US patent application publication 2002/0040310 to Lieben et al.; US patent application publication 2002/0160339 to King et al.; PCT publication 01/37232 to Pfeil; US patent application publication 2003/0087700 to Wei; and U.S. Pat. No. 5,963,951 to Collins. However, currently-available schemes do not provide a comprehensive solution for simultaneously overcoming the three obstacles noted above, by concurrently offering meeting opportunities, helping participants make workable choices, and facilitating the start of relationships.

"Speed dating", a relatively-new dating method, made an important step forward. It is based on systematically arranging short (3-8 minute) introductory meetings among strangers. An equal number of, say, 20 men and 20 women, register for an event that takes place in a restaurant, a bar or a café, around 20 tables. They are identified by name tags displaying only a nickname, with full names and contact details expressly excluded. Participants are prescheduled to have brief meetings with other participants of the opposite sex, to introduce themselves and make an impression. Once the predetermined number of meetings has taken place and many participants have been introduced to those of the opposite sex, an optional conventional party is held. At the end of the event, participants report to the organizers, via a paper form or electronically, which of the parties of the opposite sex they would like to date conventionally, for romantic purposes, platonic friendships or business connections. The organizers then report to the participants, usually the next day, of successful matches, including exchanging their contact details, and participants then call each other and thereafter conduct conventional relationships.

Speed dating eliminates some of the obstacles of the prior dating methods, primarily the burden of unsuccessful first dates, the embarrassment of making a first approach to a stranger, the need to expressly reject others, potential unwanted advances, and the asymmetry between men and women. However, speed dating still suffers from reliance on superficial first impressions, and thus fails to offer the chance to make a second impression, which is so critical for the majority of men and women. Speed dating not only does nothing to facilitate forming a relationship beyond the first mutual introduction, but also misses possible matching opportunities that could result from a second chance within the same group. Take the case, for example, where a man has selected two women, but neither has reciprocated by selecting him. First, he comes away from the event with nothing. Second, he may have overlooked a third woman because of his focus on the selected two. And third, one or both of the two women he originally selected may have developed an interest in him upon a second meeting. In short, speed dating eases the pain in a first meeting with strangers, but does very little to help the strangers in developing interest in each other.

There is thus a widely recognized need for, and it would be highly advantageous to have, a means whereby single people can meet and become acquainted with prospective mates in a comfortable setting that is conducive to the proper selection of a prospective mate, which responds to the needs of the majority of men and women who require a second impression for knowing and getting known by each other, which facilitates the forming and growth of solid inter-personal relationships, and which does not have the drawbacks and limitations of present methods. This goal is met by the present invention.

BRIEF SUMMARY OF THE INVENTION

Definitions

The terms "subscriber" and "participant" herein denote an individual person or an established couple undertaking to participate in games according to the present invention, for interpersonal interaction with other subscribers. Primarily, in most of the preferred embodiments described herein, a subscriber is a person seeking a mate of the opposite sex. However, a subscriber can also be a person seeking a mate of the same sex, or an established couple seeking companionship with other established couples.

The term "forum" herein denotes a closed group of subscribers from whom game participants can be selected by the system of the present invention. A forum can exist within a short-term event such as a party or a cruise; or within a long-term framework, such as a club of participating singles within a metropolitan area, who wish to interact with others in their free time. Sometimes a large group of subscribers—a "community"—can be divided into several distinct forums, each forum managed separately and autonomously according to the present invention; such division may be made on the basis of the subscribers' profiles or interests, or just randomly for easing the acquaintance between the forum members and making the games more effective.

The term "game assignment" also abbreviated "assignment" herein denotes a specification of an interpersonal activity to be performed by a subscriber, in front of or cooperatively in combination with other subscribers. Typically an assignment indicates what, when, where, and how activities are to be performed, and sometimes may also specify what is excluded and prohibited. The term "face-to-face assignment" denotes a direct personal interaction among participants, and the term "virtual assignment" denotes interaction among participants via electronic communication.

The term "game" herein denotes a selected forum subset of one or more subscribers, with a "matched" game assignment, which is a coordinated identical or complementary assignment, assigned to each selected subscriber of the subset. Often, a game is a "couple game" involving a pair of subscribers having matching "couple assignments", or a "group game" involving more than two subscribers. A "game series" herein denotes an ordered plurality of games.

The term "score" or "rank" relates to a participant expressing his or her relative level of interest for prospective mates or for an assignment in which he or she wants to participate, respectively. A high score for another participant expresses high interest in interacting with that participant, while a high rank for a specific assignment expresses high interest in performing that assignment.

The term "personal wish-list" or "wish-list" herein denotes an input from a subscriber that is entered electronically into the system of the present invention, for scoring prospective mates and/or ranking assignments. Typically, the personal wish-list addresses both with whom the subscriber wishes to interact and what assignments are preferred for such interaction.

In the context of the present invention, the term "prospective mate" is used to denote any participant who is conditionally eligible to become a mate for another given participant. A prospective mate is subject to further evaluation and may be disqualified, whereas an actual mate is considered to be someone with whom a long-term commitment is made. In some places, such as in the drawings, the term "mate" is used alone for simplicity, it is being understood that this term denotes the concept of a "prospective mate" rather than an actual mate.

BRIEF SUMMARY

The present invention provides systems and operational capabilities for a series of computer-aided games that are entertaining by themselves, and which enable singles to get to know other singles in a positive, encouraging atmosphere.

The system of the present invention can also operate to facilitate acquaintance and companionship among established couples.

A specific object of the present invention is to allow singles to initiate a contact with preferred prospective mates without disclosing their choices and wishes to others, including their preferred prospective mates.

Another object of the present invention is to give singles a chance to know and to become known by other singles who, upon initial meeting, might not be their first choice for a prospective mate; but who, upon further encounter, would be found worthy of consideration as a prospective mate.

Still another object of the present invention is to reduce the risk of embarrassment when meeting and approaching new prospective mates and either initiating a successful interaction with them or discontinuing the interaction because of disinterest.

Additionally, the present invention seeks to provide singles with the opportunity to showcase their personal qualities by entering preferences for assignments that emphasize and highlight such qualities. Also, participants may select games that reveal qualities that are important to them in the selection of a prospective mate.

Furthermore, the present invention seeks to provide equality between men and women regarding opportunities for approaching each other, to overcome traditional asymmetries that may exist in certain cultures or societies.

Also, the present invention seeks to support both face-to-face and virtual meetings, and combinations thereof.

In addition, the present invention seeks to foster the initiation of mutual affection, in a cautious and effective manner, between participants who have already developed mutual interest. Thus, a series of games with the participation of mutually-selected mates is preferably devised with an evolving order of intensity and intimacy and according to the preferences of the participants, to highlight their best qualities and build the relationship.

Broadly, the present invention provides a computer-assisted game environment that allows participants to discretely specify their preferences of whom they would like to approach and how they would like to make the approach, without disclosing their preferences to others, while still influencing the upcoming events according to those preferences.

There is thus provided, according to a preferred embodiment of the present invention, an apparatus for managing a game for a plurality of subscribers, including: a first database containing a plurality of game assignments; a second database containing a personal wish list for each of the subscribers; and a processor responsive to the second database for picking at least one subscriber from the plurality of subscribers and assigning to each of the picked subscribers an assignment from the first database. The apparatus preferably includes a random number generator to facilitate the picking and assigning operations. After a current game is completed, the apparatus is preferably operable to receive updates to the respective personal wish lists, to affect further picking and assigning operations toward the next game.

When two subscribers are picked by the apparatus for a couple game, the picking is preferably affected by their mutual attraction, calculated from their mutual scores in their respective wish lists; the game selected for such a couple is preferably affected by the ranks set by the two participants for the game assignments of the first database. Couple games are based on matched game assignments which are either identical or complementary. Games can be executed within a face-to-face meeting, or virtually via electronic communication.

Subscribers use user terminals to send their wish lists to and receive game assignments from the apparatus. A specific embodiment adapted for a televised reality show is implemented by adding TV cameras and a broadcast system to share the games and wish list with an audience, upon the participants' approval.

Also, a method for participating is social games is described. Participants use user terminals to send their personal wish list with respect to preferred mates and preferred game assignments, and to receive is return game assignments with other participants in accordance to the personal wish lists. Also, a computer-implemented software product is described to read subscribers' wish lists and pick subscribers and assign game assignments in accordance to the wish lists.

BRIEF DESCRIPTION OF SEVERAL VIEWS OF THE DRAWINGS

The invention is herein described, by way of example only, with reference to the accompanying drawings, wherein:

FIG. 4 is a schematic illustration of the content of a personal record of the subscriber database according to a preferred embodiment of the present invention.

FIG. 4A is a table illustrating an exemplary scoring of prospective mates.

FIG. 4B is a table illustrating an exemplary ranking of assignments.

FIG. 4C is a table illustrating another exemplary ranking of assignments.

FIG. 5 is a schematic illustration of game rules according to a preferred embodiment of the present invention.

FIG. 10A shows three tables containing selection strategies of assignments according to a preferred embodiment of the present invention.

DETAILED DESCRIPTION OF THE INVENTION

Figure 1:
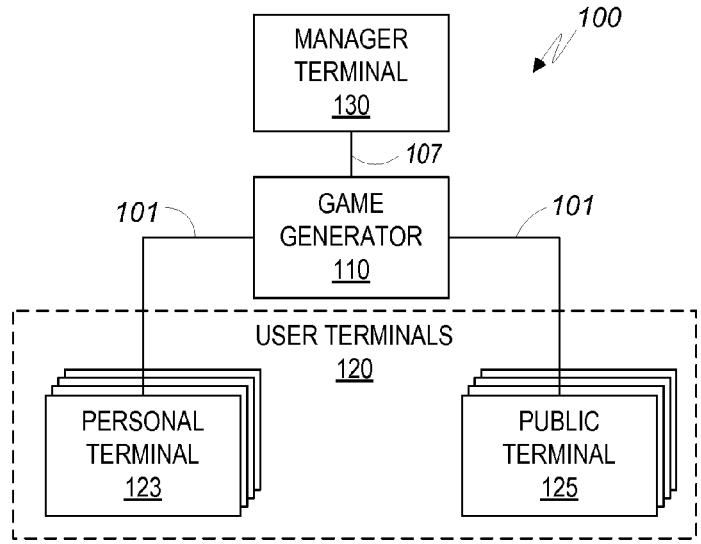
FIG. 1 is a block diagram of a preferred embodiment of a system in accordance to the present invention.

The principles and operation of a system for managing interpersonal activities according to the present invention may be understood with reference to the drawings and the accompanying description.

Overview

The system of the present invention provides a service to subscribers by arranging games in which one or more subscribers participate. The games are designed to exhibit the advantageous and attractive qualities of the subscribers, to arrange meetings and interaction with preferred prospective mates, to provide equality of opportunity between women and men, to induce a romantic and adventurous atmosphere that encourages a personal connection between matching participants, and to build up relationships.

A game includes a game assignment assigned to a subscriber, possibly in coordination with matched game assignments assigned to other subscribers. A non-limiting example of an assignment for a single subscriber is to sing on stage in front of other subscribers during a party, while implicitly, other participants are assigned to listen to that singer. Non-limiting examples of a game for two subscribers are building a snowman together, interviewing strangers together, walking in the park for 30 minutes, or playing tennis. Non-limiting examples of a game that involves a plurality of couples include competitions among couples, such as a couples' tennis match or a trivia quiz. A non-limiting example of a game involving many subscribers is participating in a specific party or journey organized for mutual acquaintance. The content of the game assignment database is constantly evolving, and is limited only by the imagination. A good assignment is one that exhibits the advantageous qualities of the participant, encourages cooperation and teamwork, and is enjoyable and entertaining.

Games arranged according to the present invention can take place under a variety of circumstances. Games can be arranged within the context of a party, a cruise or a singles' weekend, or can be organized within the participants' free time during the work week, for example after business hours or at lunch time. They can also take place virtually, through the Internet or the telephone.

Subscribers register to become members of a forum. During registration they preferably enter their personal details and initial wish-list into the system. Preferably, they also sign a contract and commit to obey the forum's rules regarding behavior toward other participants. One of the rules preferably stipulates avoiding contact with other forum members except as instructed by the system through specific assignments.

The system of the present invention tells subscribers what to do and with whom, relieving them from the need to be original in their approach, and giving them encouragement, via a "reason" to approach others. Also, equality of opportunity between women and men is supported, allowing women in all cultures and societies to approach men without appearing aggressive, forward, or unfeminine.

A central element of the present invention is a personal wish-list entered and continually updated by each subscriber, which affects the system's selection of prospective mates and assignments. Such a wish-list preferably includes scoring the subscriber's interest in other subscribers, as well as ranking the subscriber's interest in specific assignments. Based on the individual wish-lists, the system assigns game assignments to the subscribers. The system gives higher probability to assignments between subscribers who prefer the company of each other, lower probability if only one expresses interest in the other, and even lower probability for engaging couples who are neutral to each other, provided that neither has designated the other as unacceptable. Then, after each game is concluded, the participants are preferably invited to enter their feedback by updating their wish-list. Thus, if two neutral participants discover a liking for each other during the game, they discreetly upgrade the scoring of their prospective mate, which increases the probability of meeting the same prospective mate again in subsequent games. On the other hand, one may mark his or her previous game partner as unacceptable, avoiding further interaction with that same person.

An important preferred feature of the present invention is in protecting the privacy of the subscribers. The wish-list of a subscriber is preferably kept confidential. The wish-list influences the selection of prospective mates and assignments by the system, but the preferred use of a random factor in the game selection algorithm prevents others from deducing a particular subscriber's wish-list from the visible assignments and associations. Thus, a subscriber can tell the system discreetly that he or she wishes to avoid the company of another subscriber, and never need again interact with that subscriber. This is done, however, without having to tell the other subscriber directly, and without other subscribers being able to definitely determine this preference. The opposite is also true: a subscriber can highly increase the probability of interacting with another subscriber as a prospective mate, and/or request a more daring assignment with that prospective mate, without revealing his or her feelings to any of the other subscribers. In addition, the wish-list is preferably not accessible by anyone other than the subscriber himself/herself—even the forum organizers and operators are preferably not able to access this information. In order not to disqualify subscribers that may benefit from a "second look" for appreciating their qualities, the rules preferably limit the number or percentage of subscribers one is allowed to exclude as unacceptable.

Often, a couple of subscribers that has developed a liking for each other during their interactions may decide to quit their membership in the forum, because they wish to continue to develop their relationship independently by themselves outside the forum. This may be exercised by the two assigning a "most preferred" status to each other and mutually selecting to "retire from the forum with my most preferred prospective mate" as their preferred next assignment. Such events are the ultimate success of the system of the present invention.

A forum according to the present invention can also be configured to match established couples who seek companionship to form a long term company. It can also be configured to match persons of the same sex. Or, a forum according to the present invention can be established and configured for entertaining singles and/or established couples, rather than for creating a framework for matchmaking. In all above cases, it is necessary only to adapt the assignments and the game rules to attain the desired atmosphere and results.

System Description

Reference is made to FIG. 1, which shows a preferred embodiment 100 of the present invention. Game generator 110 is the heart of the system. It is a computer that communicates with subscribers through user terminals 120, which include personal terminals 123 and/or public terminals 125, and is controlled by the forum organizer via a manager terminal 130. The term "computer" herein denotes any data processing device or system, including, but not limited to personal computers (PCs), data networks and Internet servers. Personal terminal 123 is a device that is personal to a subscriber for allowing data entry into and/or data reception from game generator 110. Examples of personal terminal 123 include, but are not limited to, cellular telephones with short message service (SMS) capability, one-way and two-way pagers, and personal computers of all types and sizes connectable to the Internet, to a cellular telephony network, to a cellular wireless data network, or to a local wireless network using short-range IR or RF communication (the latter case being useful especially for preferred embodiments of the present invention that are implemented within a confined small area). If virtual assignments are included, personal terminals 123 are also used for subscriber-to-subscriber communication, which adds devices such as land telephones and video phones in the list of optional personal terminals 123. Public terminal 125 is any input and/or output device accessible to more than one subscriber and allowing data entry into and/or data reception from game generator 110. Non-limiting examples include a public computer allowing a subscriber to communicate with game generator 110 via the Internet or a local network, by identifying himself or herself by username and password (or an alternative user authentication means); a video screen; a video projector; a printer printing game details; or a public address system used to announce games within a party. It will be appreciated that in some embodiments a subscriber may use various communication options, for example enter his/her personal record via a home PC 123 connected to the Internet, update his/her wish-list by sending an SMS message from cellular telephone 123 to game generator 110, and read the details of his/her next game on a large video screen 125 within a party site. Manager terminal 130 allows the forum organizer to customize, enter and update assignments and game rules, monitor games, and intervene or veto in exceptional cases, for instance when an outdoors assignment is impossible due to current weather conditions. Communication links 101 and 107 may include all kinds of wired and wireless communication means known in the art, capable of carrying signals between game generator 110, manager terminal 130 and user terminals 120.

Figure 2:
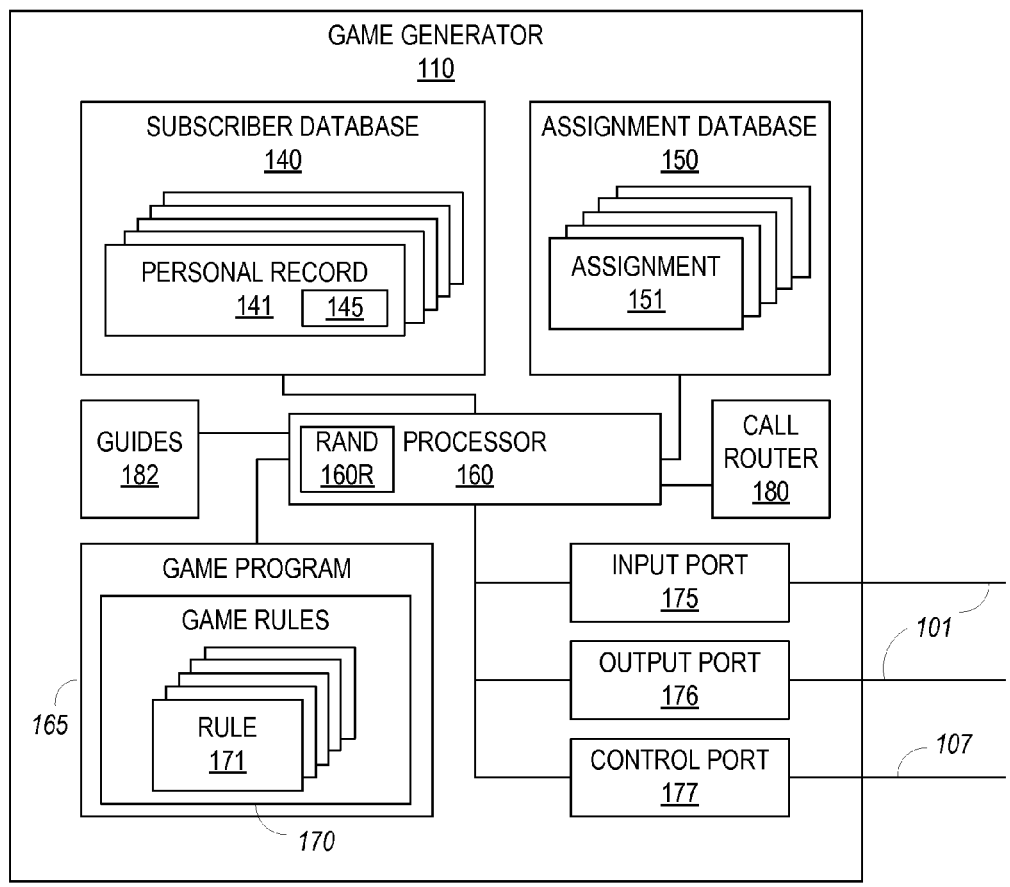
FIG. 2 is a block diagram of a game generator that forms part of a preferred embodiment of the present invention.

Reference is now made to FIG. 2, which illustrates game generator 110 in more detail. A processor 160 includes a computer programmed to run a game program 165 which generates games by assigning assignments from an assignment database 150 to subscribers from a subscriber database 140, according to subscriber wish-lists 145 included in personal records 141 and to game rules 170. Processor 160 preferably includes a random number generator 160R for including a random factor in the selection of game participants and/or assignments, which facilitates selections of assignments and participants and protects the privacy of subscribers by masking their wish-lists; thus, from a game assigned to a subscriber one cannot determine with certainty whether the associated assignment or partner were preferred in that subscriber's wish-list or just selected randomly by processor 160 using random number generator 160R. Subscriber database 140 includes, for each subscriber, personal record 141, entered by the subscriber upon subscription and being updated regularly, in particular to refresh the subscriber's wish-list 145 in response to the results of recent games; the subscriber inputs are made using user terminals 120 and are received thorough input port 175 and communication link 101. Assignment database 150 includes assignments 151, and game rules 170 include rules 171; both are optionally customized by the forum organizer using manager terminal 130, and are received via control port 177 and communication link 107. Output port 176 is used to announce the games generated by processor 160 by sending game details to user terminals 120 via communication link 101. Guide database 182 includes viewable and/or printable files with guides for forum organizers and subscribers, providing guidelines, ideas and tips to make the games more effective. Such guides are distributed when appropriate by processor 160 via manager terminal 130 or user terminals 120. Call router 180 is optionally included for cases where the system of the present invention is applied to manage virtual games, to allow subscribers to communicate with each other while masking their contact details (e.g. cellular telephone number or email address), as illustrated in more detail in FIG. 17.

It will be appreciated that the blocks described in FIGS. 1-2 are logical rather than physical entities, and can be implemented using a variety of suitable hardware, operating systems and database software known to persons skilled in the art. Moreover, they can be hosted on computer networks, and even have a single block spread over more than a single computer; in particular, personal record 141 may have the personal wish-list record 145 hosted on a different computer from the one hosting the other contents of the record, for functionality or privacy reasons. Also, the system can be compacted, even to the extreme case of an all-in-one configuration, wherein a single personal computer is used to implement the functionalities of game generator 110, manager terminal 130, and user terminals 120 materialized as a public terminal 125.

The Game Assignment Database

An important feature of the present invention is a collection of a plurality of game assignments, collectively devised to highlight the participants' qualities, to create mutual interest, to encourage togetherness, to induce a romantic and adventurous atmosphere, and to entertain. The term "assignment database" herein denotes any such collection of a plurality of game assignments that is accessible to a computer, as defined herein. Assignments are categorized into face-to-face assignments where a participant directly meets other participants, and/or virtual assignments, where a meeting between participants takes place over a communication link such as Internet mail or chat, telephone calls, or SMS messages.

Figure 3:
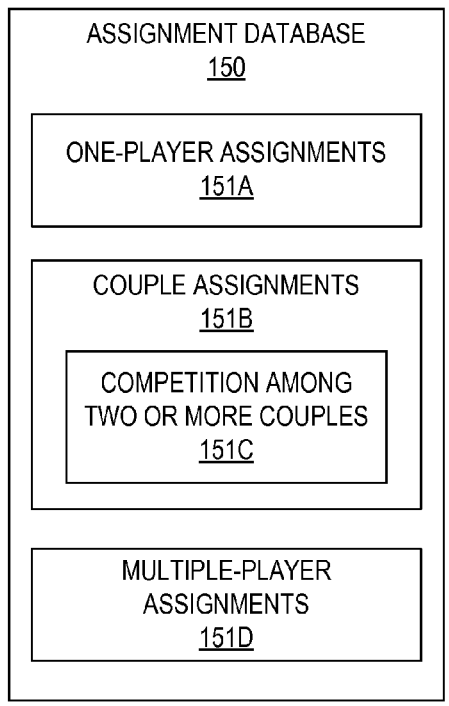
FIG. 3 is a schematic illustration of the content of an assignment database included in a game generator according to a preferred embodiment of the present invention.

FIG. 3 illustrates assignment database 150 in more detail. It contains assignments 151 in various assignment categories such as one-player assignments 151A, couple assignments 151B (including competitions among two or more couples 151C), and multiple-player assignments 151D.

One-player assignments 151A are designed to exhibit an individual's talents and personality to a plurality of subscribers. Thus, in one-player assignment other subscribers are implicitly assigned as an audience. Non-limiting examples of one-player assignments include:

Singing on stage;
Organizing and leading a journey;
Telling a story to a group of listeners;
Serving a home-baked cake;
Composing a poem on a specified theme and distributing it electronically to the forum members within a specified schedule (virtual assignment).

Couple assignments 151B are designed to acquaint prospective mates with one another and encourage togetherness and cooperation. Non-limiting examples include participating in:

Building a snowman;
Meeting for lunch;
Walking in the park for 30 minutes;
Playing tennis;
Rehearsing and performing a song on stage, where one sings and the other plays the piano;
Inviting the other to a home-cooked meal;
Playing chess over the internet (virtual assignment);
Chatting over a cellular phone on a specified topic for a predetermined amount of time while driving to work, when the participants are simultaneously called and guided by the game generator (virtual assignment).

Couple competition assignments 151C are a subset of couple assignments 151B, devised to further encourage togetherness and cooperation by a participating couple by competing against other couples. Non-limiting examples include participating in:

A multiple-couple trivia quiz;
A tournament of couples-tennis matches;
Dance competition;
A multiple-couple trivia quiz over the Internet (virtual assignment).

Multiple-player assignments 151D involve a number of individuals and introduce them to each other when they are not yet ready to select a prospective mate or be selected as a prospective mate, or when the system could not assign them a prospective mate in a current game session. Some non-limiting examples include participating in:

Having a picnic in the park and discussing free press;
Going on a one-day cruise and studying folk dancing;
Volunteering to entertain children in the hospital via pre-defined teams and roles;
Seeing a movie and discussing it afterwards;
Playing a role-game, wherein each participant has a pre-assigned role, such as in a theater play or in a simulation of real-life situations;
Having a group discussion in an Internet chat room on a specified theme (virtual assignment).

It will be appreciated that games are composed of matched assignments, i.e. assignments that are identical or complementary and are executed in a coordinated manner. Thus, to further game formation the assignments from database 150 are further fine-tuned to include additional details of where, when, with whom and how, as well as definition of complementary roles in the appropriate cases, such as who is playing the piano and who is singing.

Figure 3A:
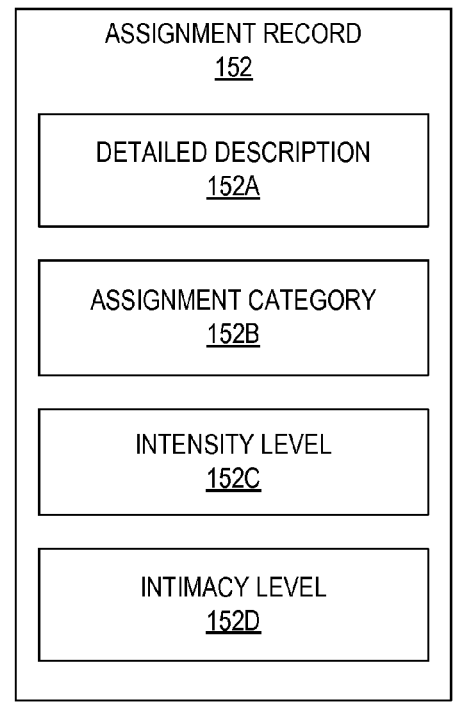
FIG. 3A is a schematic illustration of the content of a record from the assignment database.

FIG. 3A shows the contents of each record 152 of an assignment 151 from assignment database 150. Detailed description 152A is a field describing the assignment in detail. When sent to a subscriber, this information, with added details pertaining to specifics such as partner identification, place, time and matched roles, where appropriate, explains to the subscriber how to participate. In the case where the respective game is composed of complementary, non-identical assignments, field 152A includes the respective variations. Field 152B indicates the assignment category from fields 151A-151D. Fields 152C and 152D specify the intensity and intimacy levels, respectively, that are pre-assigned to each assignment, in the scale of, say, 1-5; this allows the system to escalate interpersonal interaction by assigning lighter assignments to a couple in their first meeting, and gradually increasing the level of intensity and intimacy for the next mutual meetings; thus, building a snowman can be assigned, for example, intensity 2 and intimacy 2, walking in the park is assigned intensity 1 and intimacy 3, and man inviting a woman for a dinner he cooked can be assigned intensity 3 and intimacy 4. Assignments with higher levels of intensity and intimacy can be also adapted to couples which have reached a predefined mutual attraction score, as discussed regarding FIGS. 5 and 10 below. Also, the intensity rating can be calibrated for participants in assignments that involve face-to-face meetings, when the system realizes that they reside far away from each other; thus, meeting for a cup of coffee could be rated at intensity level 1 for participants who are neighbors, but rated at intensity level 4 for participants who need to travel 40 miles to meet. Also, in an exemplary embodiment, the intensity of all face-to-face assignments can be temporarily upgraded if the forum organizer recognizes that harsh weather conditions suggest a preference for virtual assignments.

It will be appreciated that both the list of categories and the specific assignments of assignment database 150 described above are exemplary only, and assignment database 150 is expected to be ever-evolving and continually updated. It will be noted also that assignment database 150, as well as a subset actually shown and offered to each specific subscriber, may change between game sessions in accordance to weather conditions, the level of mutual acquaintance among participants selected for the same game, and personal profiles.

Figure 3B:
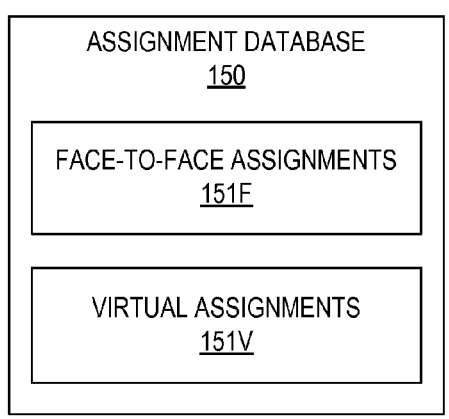
FIG. 3B is a schematic illustration of an assignment categorization within the assignment database.

FIG. 3B demonstrates symbolically that assignments within database 150 can include face-to-face assignments 151F and/or virtual assignments 151V, which respectively relate to direct personal interaction among participants and interaction among participants via electronic communication.

Figure 3C:
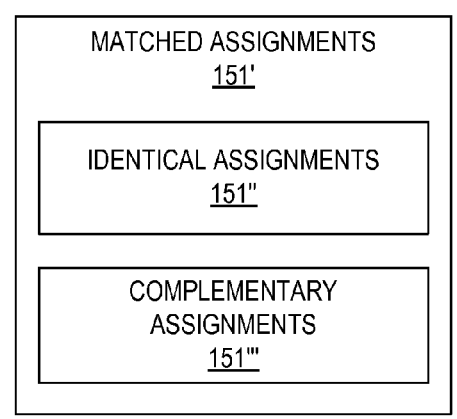
FIG. 3C is a schematic illustration of another assignment categorization within the assignment database.

FIG. 3C demonstrates symbolically that matched assignments 151' within database 150 that are adequate for couple or multiple-player games can include identical assignments 151" (e.g. a couple building a snowman together) and/or complementary assignments 151''' (e.g. the assignment of the man is to invite the woman to a dinner he cooked and to cook that dinner, while the assignment of the woman to agree to be invited and then join him for that dinner).

FIG. 4 illustrates a personal record 141 from subscriber database 140, including a subscriber ID record 142, which is unique within a forum. This ID is preferably used for all system transactions related to a specific subscriber. The ID can be, for example, a serial number assigned by the system, or a nickname chosen by the subscriber and checked by the system for uniqueness. It may be printed on badges borne by party participants, or be included in a subset of the subscriber database that is made accessible to the forum members and includes IDs and photos. Personal data record 143 includes all the usual personal details that generally categorize a person, such as name, age, sex, profession, marital status, height, hobbies, smoking habits, photo, and contact details. It also includes the subscriber terminal address, i.e., the specifics of user terminal 120 for sending assignments to the user, such as an email address, a cell phone number or a pager number, a log-in username and password, etc. If the forum allows games to take place during the week and not only within a specific event, the subscriber's free-time days and hours are indicated and updated as needed in personal data record 143 through user terminal 120. Game participation history record 144 includes past games and partners, to enable processor 160 to take the past history into account when assigning new assignments, e.g. for avoiding the repetition of assignments or for minimizing the probability that poor mutual connections are repeated.

Personal wish-list 145 is central to the present invention since it allows a subscriber to influence the assortment of partners and assignments assigned to him or her by the system, by scoring prospective subscribers and assignments. The scoring system described below uses the scale of 0-9 (one decimal digit) to facilitate compact scoring protocols when cellular SMS or DTMF messaging is used, as explained in more detail below. Wish list 145 includes prospective mate scores, which is a table tying a score (0-9) to the ID of each potential prospective mate. If a subscriber has identified a unique partner with whom he or she would like to spend time, that partner is scored '9' in table 145M. Rules 170 then highly increase the probability of the subscriber's next game involving the selected mate, especially if a symmetric selection has been made by that prospective mate in his or her wish-list 145. While preferably only one subscriber ID can be scored '9' by each subscriber, any number of other score figures can be entered into table 145M with respect to other subscribers, affecting the probability of meeting one of them. Score of '0' identifies "unacceptable" or "excluded" prospective mates that the present subscriber does not want to meet, and accordingly will not be assigned to him or her by the system. Preferably, the number or percentage of excluded prospective mates entered into table 145M is limited by the system, to reduce the probability of lockup situations, whereby a subscriber is excluded by all participants of the opposite sex not excluded by him or her. Preferably, all subscribers not specifically scored default to score '1', with a low but non-zero probability of being assigned for a mutual game. Since a few exceptionally-attractive people may be widely scored high by many other subscribers, only a few of them can have their first choice fulfilled, and many games thus involve prospective mates that were initially less interested in each other. After the game, each subscriber has a better and sounder opinion on his or her prospective mate, and has an opportunity to upgrade or downgrade the score of their recent partner. FIG. 4A describes an exemplary table 145M filled in by Mary who presently scores Peter, Paul, John and Jim by '6', '1', '0' and '6', respectively.

Another part of wish-list 145 of FIG. 4 is table 145A which ranks the assignments from assignment database 150. FIG. 4B describes a simplified table 145A-1 where Mary ranks assignments A, B, C, D, E, F, G, H from assignment database 150 by '0', '0', '9', '3', '4', '4', '2', '6', respectively, to affect the probability of these assignments being selected for her (obviously, the assignment details from database 150 are presented to Mary when scoring). FIG. 4C describes an alternative embodiment 145A-2 of table 145A of FIG. 4; in this embodiment, assignments are ranked also with respect to the prospective partner. Thus, in this example, Mary highly prefers to have assignment C with Peter, while with Jim she prefers to share assignment E. The assignment ranking scheme of FIG. 4C allows more flexibility than this of FIG. 4B, but requires higher effort when filling-in the wish-list, making both schemes viable alternatives.

Typically, personal wish-list 145 is dynamic and is frequently updated by subscribers as a result of game experience and the addition of new subscribers and new game assignments, or simply according to a changing mood or weather.

It will be appreciated that the scoring and ranking paradigms described above are exemplary. Other scoring paradigms, for example assigning integer number in the range of 0-3 to indicate the prospective mate and game preferences in the scale of 'excluded', 'acceptable', 'preferable' and 'the most preferable', or using a non-linear scoring such as '0', '1', '6', '9' for same, are also possible and may make it easier for subscribers to select. Even a three-level scoring paradigm may be employed, for example for classifying others as 'excluded', 'acceptable' and 'the most preferable one'; however, additional levels are desirable to allow finer and more effective pairing. Such multi-level scoring paradigms encourage the participant to give a chance, determined by the score (i.e. by the relative level of interest), not only to a single attractive participant, but also to others that require (and hopefully deserve) a second look in order to be appreciated.

In addition, personal record 141 is preferably departmentalized, to separate between general personal data of fields 142-144, and personal wish-list 145. Personal wish-list 145 reflects the intimate wishes and desires of the subscriber, and is therefore preferably accessible only to user terminal 120 of the respective subscriber and to processor 160 for generating games. Preferably, it remains inaccessible to other subscribers, as well as to manager terminal 130. Thus, in some embodiments of the present invention, personal wish-list 145 may reside on a separate storage device, or even on a separate computer for isolation from the rest of personal record 141.

Reference is now made to FIG. 5, describing game rules 170, which are part of game program 165 and influence the way processor 160 manages the system and makes game selections. Rules 171 are categorized into wish-list rules 171A, prospective mate selection rules 171B, and assignment selection rules 171C. Rules 171 are optionally updateable by the forum organizer via manager terminal 130.

Wish-list rules 171A take effect when a subscriber enters or updates his or her wish-list 145 in personal record 141 via user terminal 120. The wish-list rules are devised to prevent situations of game lockup, such as where all men could have selected the same woman as the most preferred prospective mate, and exclude all other women in the forum. Another game lockup situation would occur if all men selected a romantic dinner as their only acceptable assignment, while that particular assignment is unanimously excluded for the first assignment by all women. It is intended that the wish-list rules encourage subscribers to participate in games that they would otherwise be too shy to play. Exemplary wish-list rules may include the following constraints:

only one prospective mate can be scored '9' (most preferred) by any subscriber;

no more than 50% of subscribers of the opposite sex from subscriber database 140 may be excluded (scored '0') by a subscriber;

no more than 75% of assignments from assignment database 150 may be excluded by a subscriber.

Entries for wish list 145 that violate such rules are declined by processor 160 and the user is prompted to enter an alternative choice.

Prospective mate selection rules 171B determine the way processor 160 selects game participants. Preferably, there are rules 171D for making a first match and separate rules 171E for determining a consecutive match following a mutual game. Non-limiting examples for a first game rule 171D may include:

assign the arithmetic sum of the scores for the mutual attraction score of each couple, except that '0' is assigned for mutual attraction if any of the individual scores is '0';

make a mandatory selection of a couple whose mutual attraction score is '18', and assign a mutual assignment to both;

randomly match and select any other couple with probability according to the mutual attraction score.

An example for implementation of these rules is illustrated below with respect to FIG. 10.

Here are some non-limiting examples for consecutive game selection rules 171E, based on the scoring scheme example described with respect to rules 171D above:

keep a couple together when the mutual attraction score reaches '18';

if any of the prospective mates has upgraded the other (i.e. has increased the other's score), add '5' to the mutual attraction score toward the next couple selection;

if the mutual attraction score is between '12'-'17', keep prospective mates together with probability of 95% for up to three consecutive games;

if the mutual attraction score is between '7'-'11', keep prospective mates together with probability of 90% for up to three consecutive games;

after the third consecutive game together, prospective mates are to be matched according to the first-game rules 171D.

Assignment selection rules 171C determine the respective probabilities taken into account by processor 160 in selecting corresponding assignments in response to subscribers' wish-lists 145. Processor 160 may also take into account the game participation history 144 and a couple assignment intensity and intimacy level classification 152C and 152D, respectively, to adapt the intensity and intimacy levels to the levels of mutual acquaintance (measured, for instance, by the serial number of the mutual game for a certain couple) and mutual attraction between the two prospective mates.

The following is a non-limiting example for assignment selection rules 171C:

assign one-player assignments 151A or multiple-player assignments 151D only in cases where couple assignments 151B (including competition among couples assignments 151C) are not applicable (this may happen if the numbers of participating men and woman are not equal, or there remain only subscribers that have excluded each other);

for couple assignments, select only assignments with intensity and intimacy levels that do not exceed their mutual meeting count (i.e. not exceeding level 1 on the first meeting, level 2 at the second mutual assignment, etc.);

a couple assignment is ranked by a mutual assignment rank according to the arithmetic sum of the individual ranking of the participants, except that a mutual assignment rank of '0' is applied if either of the participants has given that assignment a rank of '0';

for a couple, select an activity randomly from all those that have passed the intimacy and intensity criteria, have not been shared by same couple before within their last ten games, and have a high mutual assignment rank;

for one-player or multiple-player assignments, randomly select assignments from those which have not been assigned before to the participant, and have a high assignment rank.

It will be appreciated that the above rules are exemplary only, and many other rules and variations can be devised according to the tastes and preferences of various audiences. Specifically, if the subscribers are already established couples and are seeking the companionship of other couples or just entertainment, all couples' games and selection rules need to be adapted accordingly. Appropriate modifications are also needed if the subscribers are seeking partners of the same sex.

Operation of a Preferred Embodiment

Figure 6:
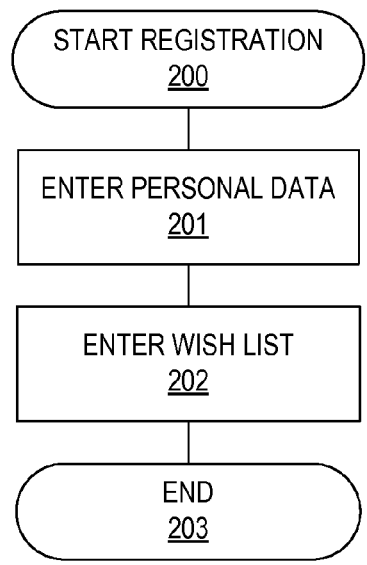
FIG. 6 is a flowchart of a registration process in a preferred embodiment of the present invention.

Reference in made to FIG. 6, which illustrates the registration process for a new subscriber. Registration starts in a step 200, where administrative forms and contracts (not shown) may be filled and signed, to establish the subscriber's obligations to the organizer and the other subscribers, such as payment arrangements with the organizer and committing not to communicate with other subscribers out of the framework of the games of the present invention. In a step 201 the user approaches a user terminal 120 to establish the respective personal record 141 in subscriber database 140, selecting or being assigned a subscriber ID 142, and entering personal data 143. In a step 202 the user enters his or her initial wish-list 145, primarily with respect to game preferences, and in a step 203 registration is concluded, and system 100 can now notify the new subscriber to participate in games.

Figure 7:
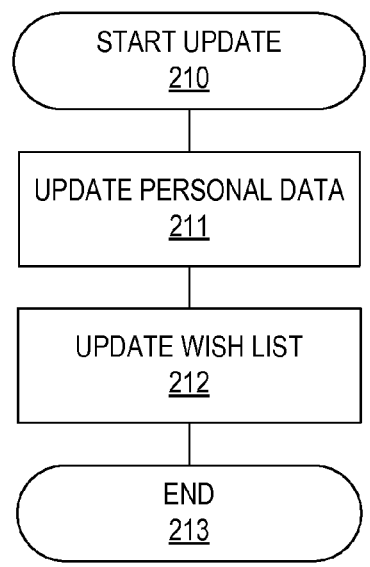
FIG. 7 is a flowchart of an update process in a preferred embodiment of the present invention.

Reference is now made to FIG. 7, which illustrates an update routine of personal record 141. Such a routine can preferably be called on the user's initiative at any time, to update his or her personal details or wish-list. Typically, the routine is called after the forum members are introduced the first time, after completing a game, when new assignments 151 are added to assignment database 150, or when another subscriber has joined or left the forum. In a step 210 the update procedure starts when the subscriber approaches user terminal 120 and logs in properly to gain access to his or her personal record 141. In a step 211, the personal data is updated, if appropriate, for example by changing address or updating the free hours' details. In a step 212, the subscriber updates his or her personal wish-list 145, and in a step 213 the procedure is concluded.

Figure 8:
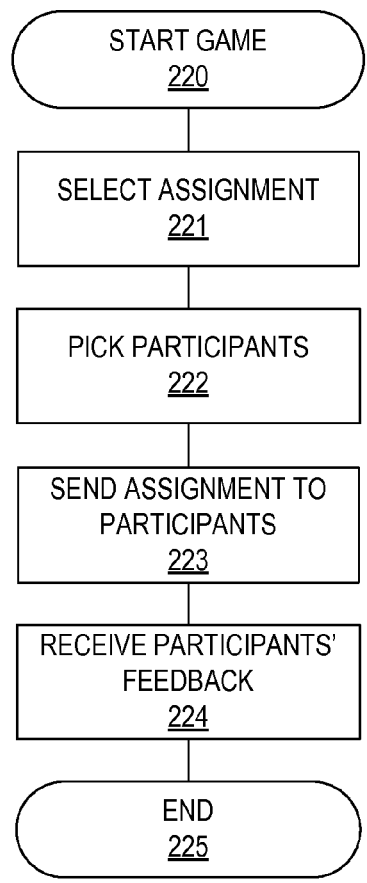
FIG. 8 is a flowchart of a game procedure within a preferred embodiment of the present invention.

FIG. 8 illustrates an exemplary strategy for game selection by processor 160 running game program 165. In a step 220, a game starts upon the initiative of the forum organizer through manager terminal 130, or automatically in a pre-scheduled time by game program 165. In a step 221, assignment 151 is selected randomly by processor 160 from assignment database 150; the assignment specifies the required number of participants. In a step 222, processor 160 runs through the personal wish-lists 145 of personal records 141 in subscriber database 140, to identify subscribers that are suitable for the assignment, and prioritizes them according to their preferences indicated in their personal wish-list 145 and according to game rules 170. For example, if the assignment is relates to a couple game of building a snowman, and if only two participants have selected building a snowman as their preferred assignment while none of them has excluded the other, these two participants can be picked by step 222. If step 222 does not yield a sufficient number of participants, the procedure returns to step 221 for selecting an alternative assignment (this branch in the procedure is not shown in FIG. 8). In a step 223 the assignment, including, as appropriate, the assignment description, partner(s), location, and time, is sent to the respective participants. After the game is completed, in a step 224 participants optionally enter their feedback by updating their personal wish-list 145 (see also FIG. 7), and the procedure is concluded in a step 225, also by updating game participation history record 144 of all participating subscribers. It will be appreciated that step 224 may be set by some forum organizers in game rules 170 as mandatory, i.e. as a precondition for participation in the next game, in order to encourage participants to make a decision regarding the prospective mate and update their wish-list accordingly; obviously, a null update—meaning 'no change'—is acceptable in this case. The feedback in step 224 may also include personal advice for the prospective mate, which, after accumulating and blending with other feedback, can be anonymously sent by the system to the prospective mate to suggest improvements in the way he or she behaves, dresses, etc. Feedback in step 224 may also include the subscriber's ideas on new assignments or improvements to existing assignments as well as subjectively scoring such assignment for effectiveness and enjoyment. Feedback in step 224 can also inform the forum organizer about participants who do not obey the forum rules.

Figure 9:
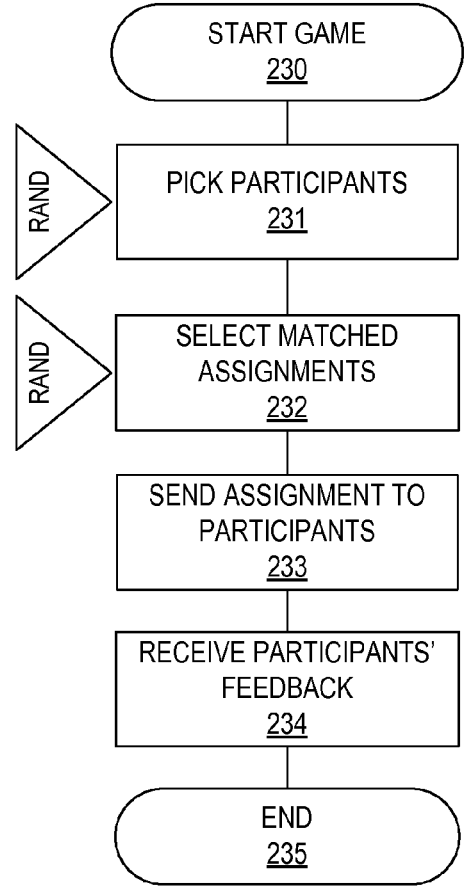
FIG. 9 is a flowchart of a game procedure within an alternative preferred embodiment of the present invention.

FIG. 9 illustrates an alternative exemplary strategy for game selection by processor 160 running game program 165. The difference in the strategy of FIG. 9 in comparison with that of FIG. 8 is that in FIG. 9, the participants are selected first, and only then are the respective assignments selected. In a step 230, a game starts upon the initiative of the forum organizer through manager terminal 130 or automatically by game program 165. In a step 231, a group of one or more subscribers is picked, for example, a couple. The subscriber couple is picked by processor 160 running program 165, preferably involving a random factor received from random number generator 160R, as illustrated in more detail for an example in FIG. 10. Including a random factor both facilitates the selection procedure and protects the privacy of subscribers, because no one can tell whether a prospective mate selection was made by the subscriber or just by chance. In a step 232, assignment database 150 is scanned by processor 160 to identify matched couple assignments from categories 151B (including 151C) that best match the preferences of the subscribers picked in step 231, as specified in the subscribers' respective personal wish-lists 145 and under game rules 170. Preferably, an assignment is randomly selected from the assignments that are ranked high. The identified assignments are matched in the sense that they are either identical or complementary in a coordinated manner so that they properly combine into an attractive game. In a step 233 the matched assignments, including as appropriate, the assignment description, partner(s), location, and time, are sent to the respective participants. If the matched assignments are complementary and not identical, such as in a couple game where the man invites the woman for a dinner that he cooked, then the complementary assignments are selected and sent as appropriate. After the game is completed, in a step 234 the participants usually enter their feedback by updating their respective personal wish-list 145 (see also FIG. 7), and the procedure is concluded in a step 235, also by updating the game participation history record 144 of the participating subscribers.

Selection of Participants and Assignments

The selection of games within a system according to a preferred embodiment of the present invention includes, for each game, the selection of participating subscribers from subscriber database 140, and selection of assignments from assignment database 150. These selections are influenced by personal wish-lists 145 and by game rules 170. The following description discusses a number of alternative strategies for such selections, with focus on selecting subscriber couples, and how random number generator 160R can be employed in making such selections.

Figure 10:
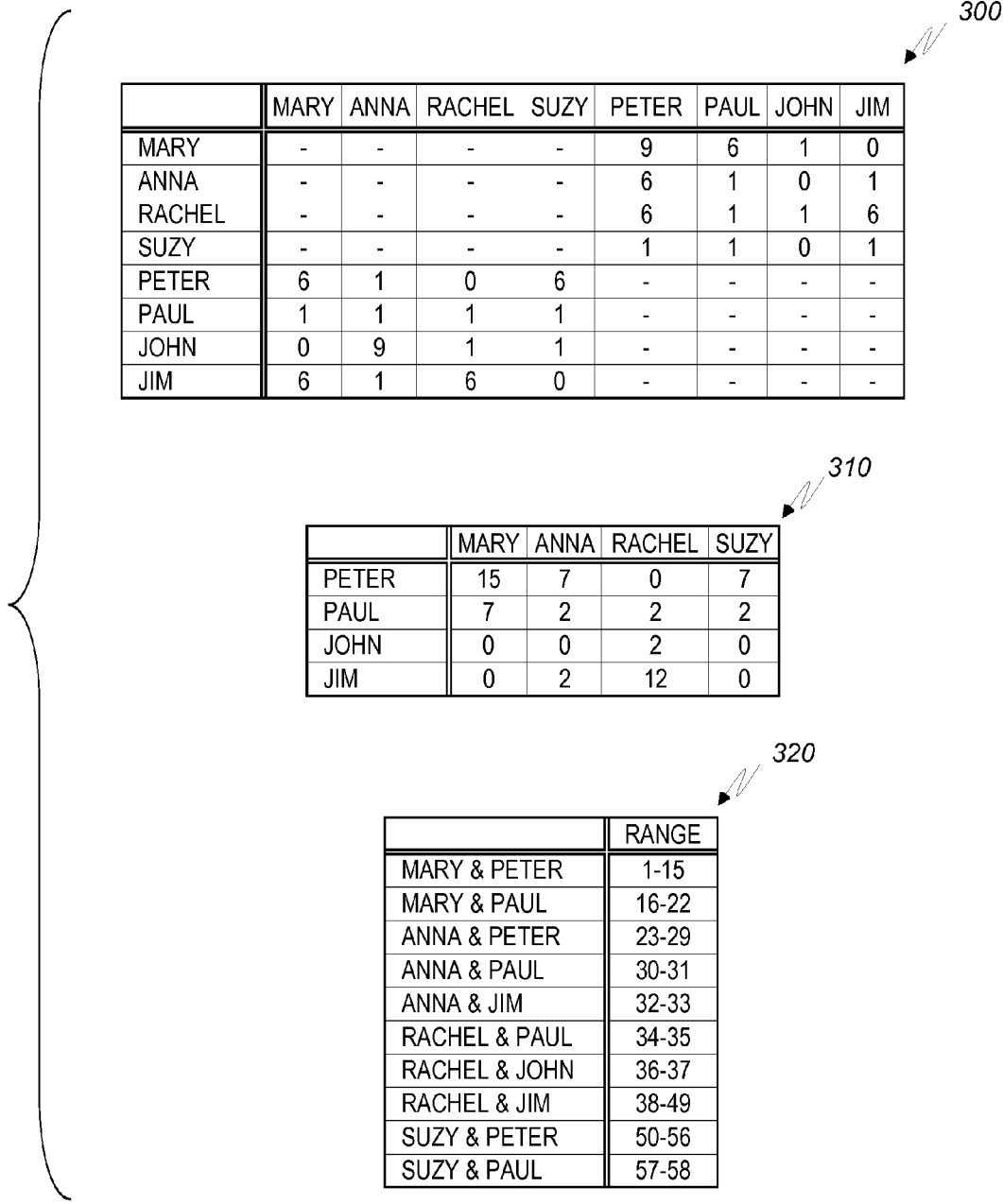
FIG. 10 shows three tables containing selection strategies of couples according to a preferred embodiment of the present invention.

Reference is made to FIG. 10, which illustrates a simplified forum consisting of four men and four women. A table 300 describes the partner preferences of the participants as derived from their personal wish-lists 145. In table 300, the participants doing the scoring are listed in the left-most header column, and their preferences run horizontally in rows. The participants being scored are listed in the top header row, and their scores run vertically in columns. For example, the first row in table 300 shows that Mary has selected Peter as her most preferred partner and Paul as a preferred partner. Mary is neutral regarding John, and Jim is excluded by her; these selections are transformed into table entries '9', '6', '1' and '0', respectively, which describe the relative scores of the selections. The other seven rows of table 300 describe the partner selection made by the other seven forum members in their respective wish-lists 145.

A table 310 is derived by processor 160 from table 300, and shows the mutual attraction scores of all possible couples, based on totaling the individual scores selected by the prospective mates, except that if any of the prospective mates is excluded by the other, the mutual attraction score is zero. Thus, Mary has given Peter 9 points (most preferred'), Peter has given Mary 6 points (preferred'), which scores the couple Mary-Peter 15 points in mutual attraction. On the other hand, although Rachel likes Peter (6 points), Peter dislikes Rachel (0 points) which yields the mutual attraction score of '0'. Thus table 310 reflects the mutual attraction of the potential couples, and the higher the mutual attraction score, the greater is the chance that a couple is selected for the next game.

The following examples demonstrate three couple-selection strategies, which may be decided by the forum organizer through game rules 170. It will be noted that in the present example none of the couples has reached the mutual attraction score '18', which would have made it compulsory to select them as a couple, according to selection rules 171B (FIG. 5). Exemplary selection strategies in accordance to preferred embodiments of the present invention include:

- Favoring the poor: John's only chance is with Rachel, who is the only one who has not excluded him and was not excluded by him. Therefore, the couple John-Rachel could be first selected. This, however, could be unfair to Rachel-Jim, who clearly prefer the company of each other.
- Favoring the rich: Peter-Mary score highest, and therefore could be selected first, followed by selecting Rachel-Jim, who score second, etc.
- Making a random selection, weighted by the mutual attraction but leaving the final decision to chance. A table 320 describes ranges of integers granted to each of the ten non-zero couples. Range 1-15 is granted to Mary-Peter for their '15' mutual attraction points from table 310. The next range of seven integer numbers 16-22 is granted to Mary-Paul for their '7' mutual attraction points. Table 320 ends with granting the range 57-58 to Suzy-Paul for their '2' mutual attraction points. Thus, the integer range 1-58 has been created and divided into sub-ranges whose respective spans represent the probability of selecting a couple according to the respective mutual attraction score. Random number generator 160R is now called to draw a number in the range of 1-58 with uniform probability. If, for instance, number 21 comes up, then the couple Mary-Paul is selected, in spite of the greater score (and probability) for selecting the couple Mary-Peter. Then Paul and Mary are removed from table 310, along with their respective row and column, and table 310 is truncated into a 3×3 table, leading to a more compact form of table 320, and another random number is drawn within the corresponding truncated number range to select the next couple.

All the mate-selection strategies described above, as well as combinations thereof, are acceptable in various embodiments of the present invention. However, the strategy used in most examples below is the random-selection approach.

Under any strategy, there is a possibility that there remain subscribers who cannot be matched to other subscribers within the current session of games. Such subscribers can be referred to single-subscriber games from the 151A category or multiple-subscriber games from category 151D, with an opportunity to exhibit their qualities to other subscribers, as well as enjoying the game by itself. In the next session of games these single subscribers may be selected to participate in a couples' game because they have been upgraded in the wish-list of others, or have reduced the number of unacceptable partners in their own wish-list, or have just been more fortunate with respect to the drawings made by random number generator 160R.

If the numbers of men and women are unequal, it could be advantageous to allocate only, say, 75% of the minority sex members to couples' games, and then move all remaining men and women to single or group games within the current session. During the next game session others may be selected for couples' games under the rules of the system.

It will be appreciated that the couple selection strategy illustrated in FIG. 10 offers equality between men and women, since the scores for preference and mutual attraction calculated in tables 300 and 310, respectively, are based on symmetric scoring rules. Although this policy may be preferred by many, a forum or forum organizer may select to use asymmetric rules, such as granting higher weight to the wishes for women over those of men. For example, a woman preferred by man can be granted 6 points in table 300, while a man preferred by a woman can be granted 8 points, giving women a higher chance to meet with their preferred prospective mates, in case of conflict between wishes. For instance, under the symmetric policy of FIG. 10, Peter has an identical probability to be assigned as a prospective mate to Anna and to Suzy (both score '7' in table 310). Under the asymmetric policy, however, Peter-Suzy would still score '7', while Peter-Anna would score '9' and will have higher probability to meet, because of the higher weight given to the woman's (Anna's) wish.

FIG. 10A illustrates an exemplary game selection strategy for couples selected by the procedure described above with respect to FIG. 10 or by an alternative strategy. Table 330 summarizes the individual game ranking by the participants, made under the scheme described with respect to FIG. 4B. 'A', 'B', . . . , 'H' are placeholders for game specifications presented to the subscribers when they fill-in their assignment preference 145A in wish list 145. In the case of a game composed of complementary rather than identical assignments, a specific placeholder (e.g. 'A') represents the appropriate assignment for each participants; for example, if a couple game involves a man inviting a woman to a dinner he cooked, then 'A' is presented to the men as 'invite . . . ' while to the women same 'A' is presented as 'be invited . . . '. Table 340 summarizes the mutual assignment ranks by adding the individual ranks of all possible couples. Thus the mutual rank of game E by the couple Mary-Peter is '13' since Mary has ranked this game '4' and Peter has ranked it '9' (see table 330). Thus if Mary and Peter have been picked by step 231 of FIG. 9, then assignment E would preferably be selected for them, unless their history record 144 shows that they have already shared this assignment, which would lead assignment H to be selected. It will be noted that in realistic embodiments beyond the present simplified examples, the number and variety of selectable assignments is substantially higher than the eight assignments A-H, which would have led to many more possibilities for mutual assignment selections. If there are several selectable assignments that rank equally, random number generator 160R is preferably called in step 232 to facilitate selection.

It will be appreciated that the example of FIG. 10A employs the simplified assignment ranking paradigm of FIG. 4B, wherein assignment ranking by a subscriber is insensitive to the prospective mate. If the paradigm of FIG. 4C is chosen instead, then each value in table 340 of FIG. 10A will then take into account the finer ranking offered by the latter paradigm. For example, the mutual rank by Mary and Peter of assignment E will total the rank that Mary has selected for having assignment E with Peter (which may differ than the rank of having assignment E with Paul, as demonstrated in table 145A-2 of FIG. 4C) and the rank that Peter has selected for having assignment E with Mary.

Figure 11:
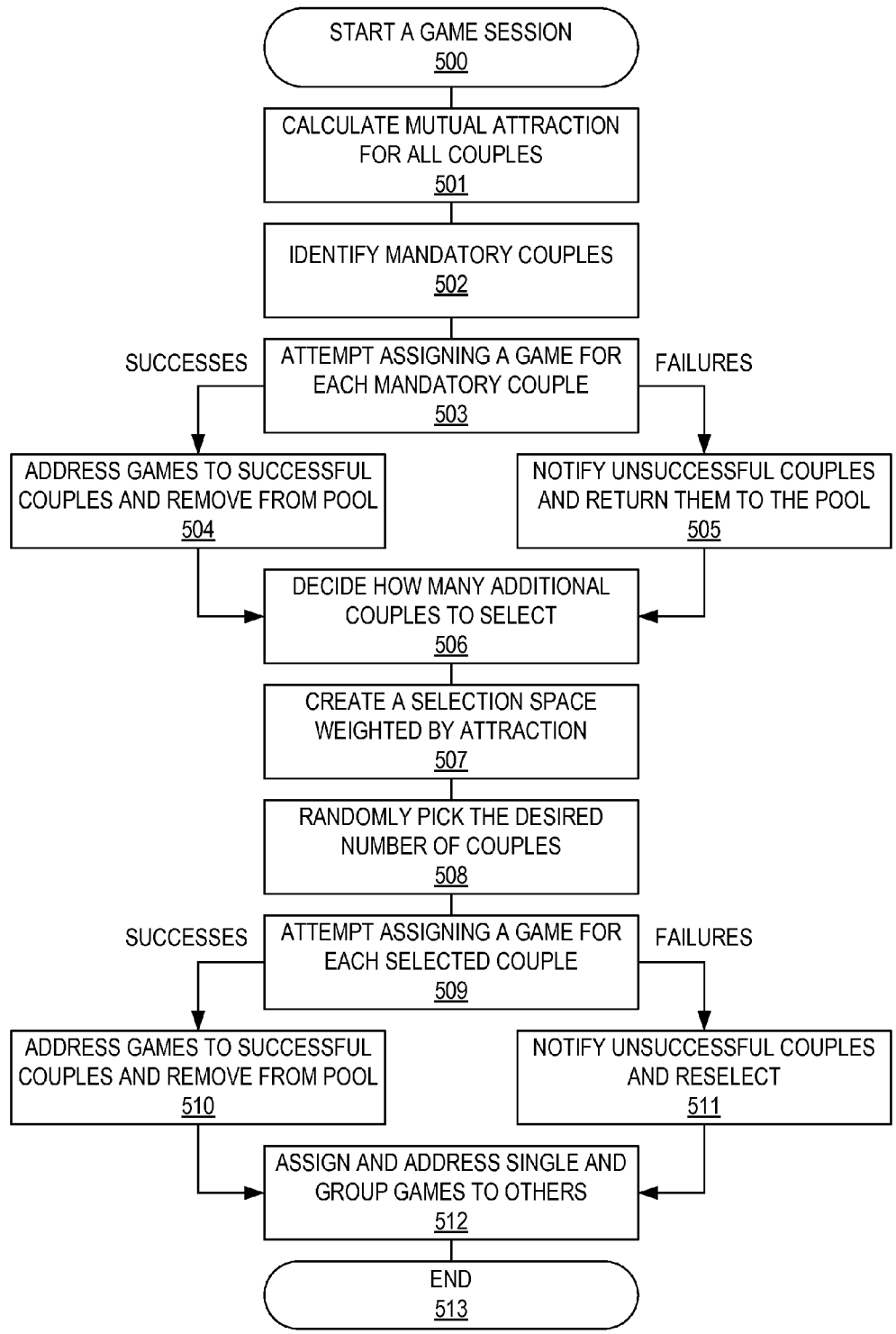
FIG. 11 is a flowchart of a game session according to an embodiment of the present invention.
Figure 12:
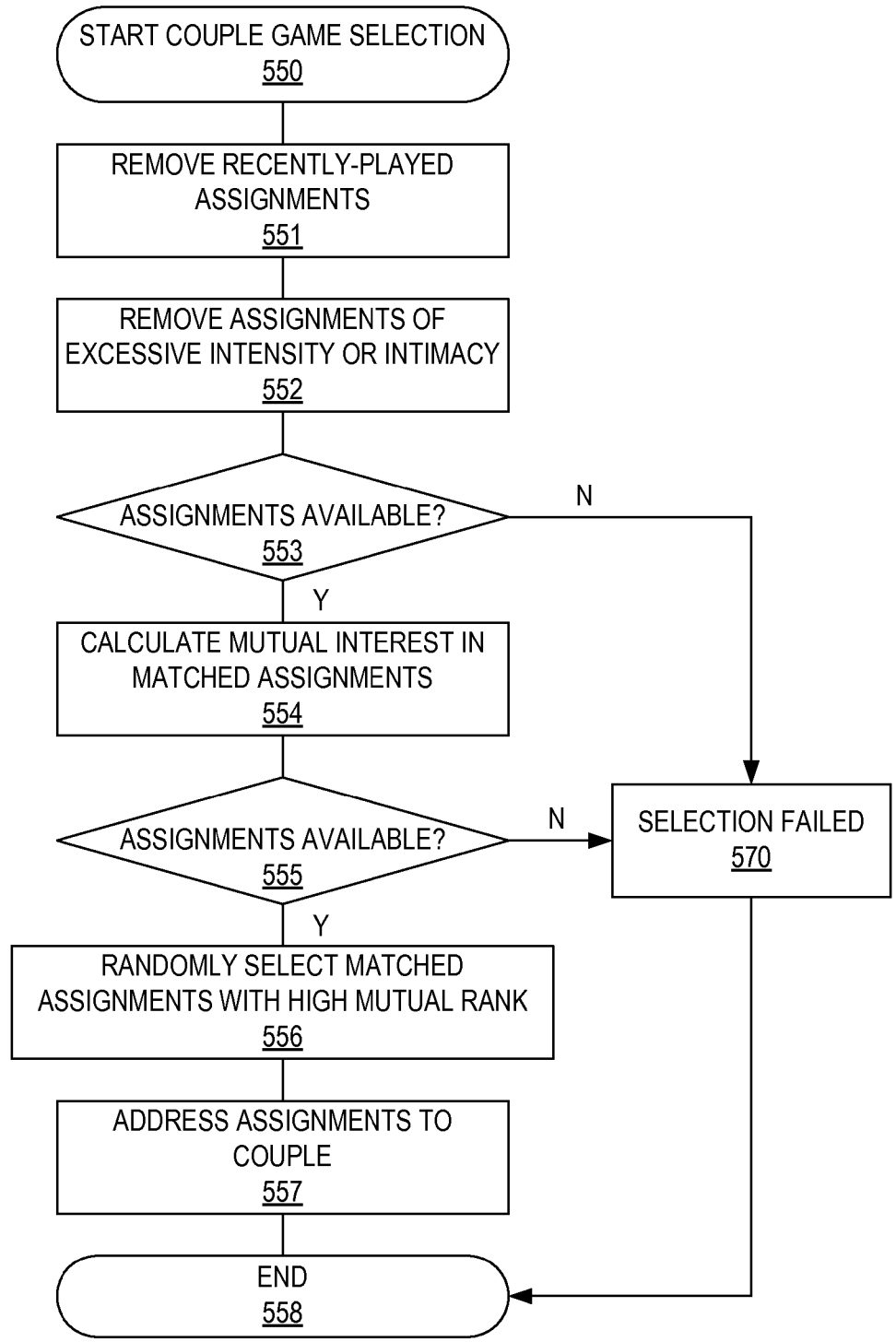
FIG. 12 is a flowchart of a game selection procedure according to an embodiment of the present invention.

FIGS. 11 and 12 generalize the couple selection and game selection processes illustrated by the example of FIGS. 10-10A. Reference is now made to FIG. 11, where a game session is started in step 500 by processor 160. In a step 501, processor 160 runs through all combinations of participating men and women, and calculates their mutual attraction score; this can be made by adding the individual respective scores as in the example of FIG. 10, by multiplying the scores, or by using other formulas that give a higher value to the mutual attraction score with higher individual score, even possibly asymmetrically with respect to men's scores versus women's scores, as explained above. Optionally, psychological models analyzing the compatibility of prospective mates can be factored into the mutual attraction calculation (e.g. by adding 4 points to the mutual attraction score calculation for a 'very compatible couple'), thus adding external wisdom to the instinctive judgment by the participants. Also, the mutual attraction score optionally and preferably factors-in the latest individual score changes; for example, if two participants have just upgraded each other, i.e. demonstrated an increase in their mutual interest, they may benefit from an extra bonus of 5 points added to their mutual score. However, the calculation algorithm preferably ensures that any individual score of '0' (i.e. an excluded prospective mate) results in a '0' in the mutual attraction score. In a step 502, mandatory couples are identified and selected. This includes all couples who have mutually selected each other as their unique 'most preferred prospective mate' (say '9'), as well as all other couples whose mutual attraction score has reached '18' by added factors as described above.

In a step 503, processor 160 attempts, for each mandatory couple, to assign a mutually-acceptable game, as illustrated in more detail in FIG. 12. When the assignment is successful, then in a step 504 the selected game is addressed as a couple of matched assignments to the participants via their respective user terminals 120. If no game is found mutually-acceptable in step 503, then in a step 505 the couple is notified through their respective user terminals 120 that they are too restrictive in their wish-lists regarding games and therefore have been reassigned with a different partner. The couple is not matched, and the participants are returned to the subscriber pool, for identifying alternative prospective mates with a better match with respect to game selection. The terms "subscriber pool" and "pool" herein denote the subscribers from the forum who are available for assignment selection within the current game session.

In a step 506, the remaining subscribers, after removing the successful matches in step 504 from the pool, are ready for further matching, and the system decides how many of them can be matched according to the game rules. In a non-limiting example this could be done by counting 75% of the minority sex in the forum and subtracting those matched in step 504. For instance, if the subscriber pool started with an entire forum of 20 women and 24 men, and if in step 504 four couples have been matched, then the overall number to be matched for couples' games is 15 (75% of 20—which is the number of participants of the minority sex). Four couples have already been matched by step 504; therefore, in step 506 it is calculated that 11 couples are still left to be matched.

In a step 507, a selection space is created by processor 160, weighting in the mutual attraction of all couple combinations of the opposite sex that were not extracted by step 504 and did not exclude each other, similar to the example of table 320 in FIG. 10. In the space according to the example of table 320 of FIG. 10, each possible couple is assigned a unique range of integers whose size varies according to the mutual attraction score calculated in step 501. In a step 508, random generator 160R is called to select a random integer within the selection space generated in step 507; the random number falls within the number range of a specific couple, and this couple is selected, and the selection space is recalculated to eliminate the selected couple members and truncate the selection space size. Then another couple is selected, until the desired number of couples, determined in step 506, is reached.

In a step 509 each couple selected in step 508 is assigned a game in accordance to the mutual preference of the prospective mates, as described in step 503 above. Successful games are addressed to successful couples, in the form of matched game assignments, in a step 510 as in step 504. If no mutual game can be assigned to the selected couple, then in a step 511 the participants are notified that they are too restrictive, and are returned to the pool. Then, the remaining subscribers are reselected by steps 507, 508 and 509, until the number of couples reaches the target calculated in step 506, or until a predefined number of attempts is reached.

In a step 512, all forum members not selected by step 504 or step 510 are preferably assigned single or group assignments, which both entertain them and allow them to better know and get to be known by other forum participants. This is done by selecting assignments according to the preferences of the subscribers, as expressed in their wish-lists. The procedure is concluded in a step 513, where the game session actually commences according to the assignments addressed to the forum subscribers.

FIG. 12 illustrates in more detail the game selection procedure described above with respect to steps 503 and 509 of FIG. 11. The procedure starts in a step 550 which is called either by step 503 or by step 509 of FIG. 11. The selection is made for a specific couple of participants of the opposite sex, from those selected by step 502 or 508. The assignments are selected from the couple assignments 151B (including 151C) of FIG. 3. In a step 551, assignments given to any of the participants during the most recent three game sessions are preferably removed from the list, to avoid boring repetition. In a step 552, assignments that are too intense or intimate for the current stage of acquaintance between the participants, are removed from the list as well, as explained above, for example, with respect to fields 152C and 152D of FIG. 3A. In a step 553, it is determined whether any matched assignments have remained from the couple assignments 151B (including 151C) after the filters that have been applied by steps 551 and 552. If no assignment has survived, then game selection fails in step 570 (however, it will be appreciated that assignment database 150 is expected to preclude such events by including a very large number of possible assignments in all assignment categories of database 150 of FIG. 3). In a step 554, the mutual interest of the participants in each surviving assignment is calculated, for example by totaling the assignment ranks in accordance with field 145A of FIG. 4, but excluding assignments that are excluded by any of the participants. If no mutual matched assignments can be identified in step 554 (i.e. all matched assignments acceptable to one participant have been excluded by the other), then a step 555 identifies this situation, leading to assignment selection failure in step 570, which further leads to step 505 or step 511 of FIG. 11. It will be appreciated, however, that a rich variety of assignments in assignment database 150 of FIG. 3, as well as the assignments selection rules 171C of FIG. 5, make the event of step 570 extremely improbable.

From the available matched assignments, in a step 556 processor 160 randomly selects a pair of matched assignments that has a high mutual assignment rank. In a step 557 the matched assignments are addressed to each of the participants (actually via step 504 or 510 of FIG. 11), and in a step 558, the couple game selection is concluded for the current couple, and game selection is performed for the next selected couple, if appropriate.

Arranging a Series of Games

Preferably, the games of the present invention are played in series, whereby the same forum of subscribers participates in a plurality of game sessions devised to establish and develop relationships among the forum members. For example, a game series can be made up of thirty game sessions, spanning six weekend parties. Each game session preferably involves all forum subscribers, participating in either couple, single or group games played concurrently or in synchronization; for example, an off-party couple game may be scheduled to take place anytime between two consecutive parties, according to the free-time schedules of the two participants.

Figure 13:
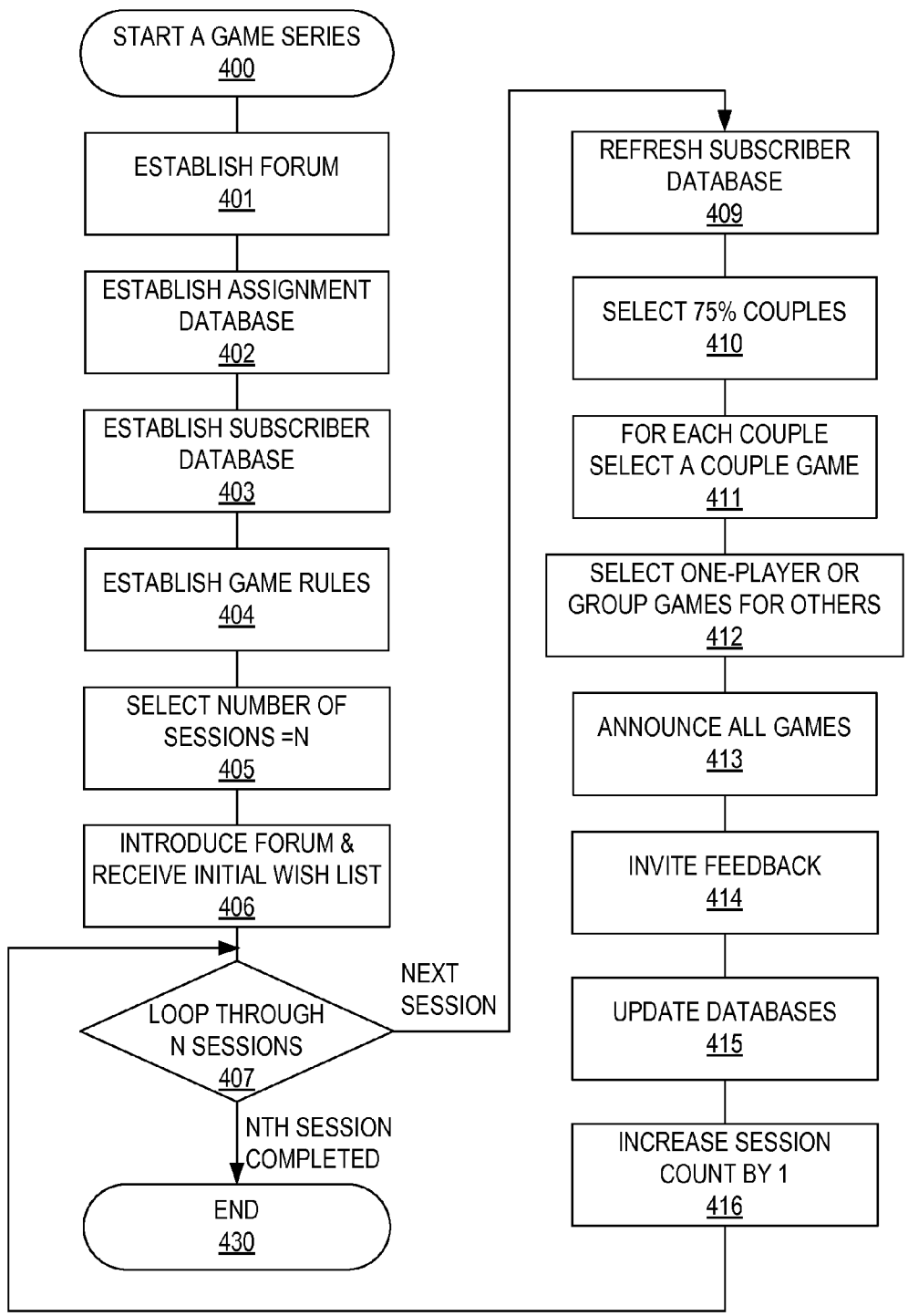
FIG. 13 is flowchart of a process for generating a series of games according to a preferred embodiment of the present invention.

FIG. 13 schematically illustrates a series of games, initiated in a step 400 by a forum organizer. In a step 401, a forum of subscribers is established. This can be accomplished by registering new subscribers as illustrated in FIG. 6, and/or by including a subset of a previous forum. In a step 402, assignment database 150 is established by the forum organizer, to include assignments relevant to the current session; for example, building a snowman is not applicable for games taking place in summer, and a forum of people living in different states or countries may limit all games to virtual assignments only. In a step 403, the subscriber database is established. New members enter their personal details and wish-lists (whereas members that have joined from a previous forum may find their older record imported into the new database), and then update their personal details and re-enter their wish-list in response to changes in the assignment database, the forum subscribers, and changing tastes. In a step 404 the forum organizer establishes the game rules, possibly with many or all of them being imported from a previous game series or from an external database (e.g. a community or universe database, as described with respect to FIG. 14 below). The number of game sessions (for example, thirty), and their timetable (for example, six weekend parties with five game sessions per party), are entered in a step 405 by the forum organizer into game program 165. Preferably, in step 406 the forum members are introduced to one another, by publishing over the Internet, with access to the forum members only, their basic details, such as ID, nickname, age, photo, profession and interests; additionally or alternatively, by the discretion of the forum organizer, forum members may hold an introductory event before commencing their first game, which could include, for example, brief one-on-one speed dates between all forum participants of the opposite sex. The mutual introductions are followed by wish-list entries of all participants, to facilitate assignment and prospective mate selection by game generator 110, toward the first game session. In a step 407 the game session count is checked, and after the last session the game series is concluded in a step 430. Otherwise, a new game session starts in a step 409, where subscriber database 140 is refreshed, for example to reflect the absence of some forum members; this also affects the wish-list 145 of attending members that may have previously selected absent members as their preferred prospective mates. In a step 410, couples are selected for couple games, for example by the random method shown in FIG. 10. The number of couples selected in step 410 for couple games might be, for example, 75% of the subscribers of the minority sex (men or women), so that there remain a sufficient number of the opposite sex to attend and induce interest in one-player and multiple-player games. In a step 411 each couple selected in step 410 is assigned a matched pair of couple assignments from databases 151B (including 151C), and in a step 412 each of the remaining subscribers is assigned a one-player assignment or a group assignment from databases 151A or 151D. In a step 413, all games are announced by sending messages describing the respective assignments to all subscribers through user terminals 120. The games are then played, and upon the conclusion of the current game session, participants are invited in a step 414 to enter their feedback, primarily by updating their personal wish-list via user terminals 120. In a step 415, the subscriber database is updated to reflect changes in the personal wish-lists 145 and game participation history 144. In a step 416, the session count is increased by 1, and in step 407 either the session is concluded in a step 430, or is continued in step 409 in accordance to the game session schedule.

It will be appreciates that a game series can include face-to-face assignments, virtual assignments, or a combination thereof, as adapted to the goals of the forum, the geographies of the subscribers, the weather conditions, and the wish-lists of the participants.

The Overall Picture

A system of the present invention operates within a forum of subscribers. However, such a system can be a subset of larger system, as illustrated in FIGS. 14-15 and discussed below.

Figure 14:
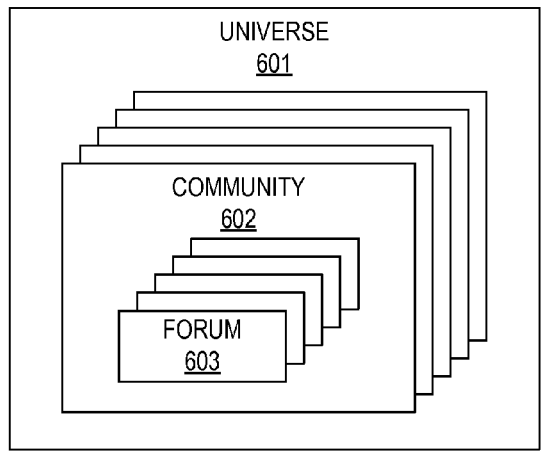
FIG. 14 is a schematic illustration of a structure of frameworks for an embodiment of the present invention.

FIG. 14 illustrates an abstract structure of frameworks for implementing embodiments of the present invention. A universe 601 includes all subscribers and entities involved in implementing the present invention. Universe 601 includes a set of communities 602, each community of which includes a plurality of subscribers registering to participate in games organized according to embodiments of the present invention, and led by a community organizer. The community is then subdivided by the community organizer into a set of forums 603, each of which is a basic element of game organization. Thus, a community may include a large group of subscribers in New York City subdivided by age, profile and geography into many small forums of, say, 12 men and 12 women in each forum. After a game session (see FIG. 13) is completed, those who found a mate retire, and the remaining members can then be divided into those who show substantial mutual attraction by their mutual attraction score, and those who show no interest in each other. The community organizer can then reshuffle the compatible community members into new forums, keeping together those with higher mutual attraction and separating the others into new forums with a new chance to identify and being identified as a desirable mate. While different forums may have strong interactions within the same community, different communities usually do not interact at the subscriber level, but may still share a central knowledge base and game and game rule databases within universe 601.

Figure 15:
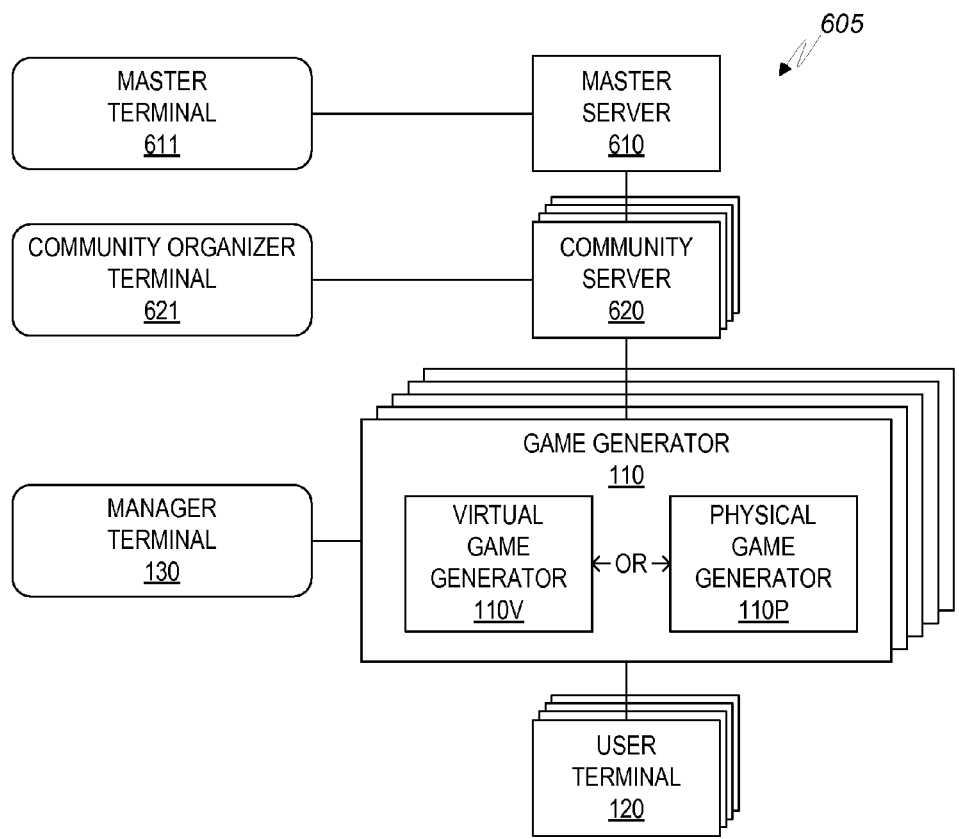
FIG. 15 is a schematic block diagram illustrating an arrangement of computers for implementing the structure of FIG. 14 according to an embodiment of the present invention.

FIG. 15 illustrates the architecture of an embodiment of a computer system 605 underlying the structure of FIG. 14. A master server 610 contains a knowledge base in the form of electronic articles to guide community and forum organizers as well as subscribers, and databases of games and games rules. These resources are partly developed by experts and are entered through a master terminal 611. Subscribers, forum organizer and community organizer can also contribute and upload resources onto community servers 620 and master server 610. A community server 620 is preferably an Internet server containing knowledge base articles, game and game rule databases, and services for game generators 110, as well as a community subscriber database. Community server 620 is controlled by the community organizer through a terminal 621, to select, customize and translate (where necessary) a subset of games and knowledge articles from master server 610, add games and knowledge articles of its own, and establish forums from of the community membership.

Continuing with FIG. 15, game generator 110, manager terminal 130 and user terminals 120, are as previously described and illustrated in FIGS. 1-13. The element emphasized in FIG. 15 is, however, that game generator 110 can be implemented as either a stand-alone physical server 110P, or as a virtual server 110V, e.g., a logical partition within the respective community server 620 or even a partition within master server 610. Thus, community server 620 can host a plurality of game generators 110, each controlled autonomously by a respective forum organizer through respective manager terminal 130. Similarly, master server 610 can host community servers 620 and game generators 110V. Similar hosting arrangements can extend to servers out of the framework of the present invention, as is common with distributed computing resources. In a most compact embodiment of the present invention, a single personal computer can serve as a game generator 110, manager terminal 130 and public user terminal 125 that allow private log-in of the subscribers. Such a compact setup can adequately serve the needs of participants of a party. Adding a short range communication port to such a personal computer, such as infrared, Bluetooth or Wi-Fi, can offer extra convenience to users who have compatible telephones, beepers or palmtop computers that serve as personal terminals 123.

The present invention is thus scalable, and embodiments thereof support small systems having a single game generator that runs a single game in a single forum as well as large systems (as illustrated in FIGS. 14-15), capable of extending across different countries, cultures, and languages. This emphasizes the nature of the components of the present invention as logical entities that are not limited by a specific physical arrangement.

Game Customization

Assignment databases and assignment particulars may be customized at various levels by various players. A community organizer may selectively choose games that are suited to the culture of the local community as well as to the season and climate. A forum organizer may further selectively choose assignments in accordance with the age and profile of the forum members, and add specific assignment attributes. For example, if a couple assignment description involves having a dinner at a restaurant, the forum organizer may add the name of the restaurant, the number of the pre-ordered table, and the date and time of the meeting. Assignments may also be fine-tuned by subscribers. For instance, an assignment to a couple visiting the theater may be first sent to the woman for selecting the show, date and time, and only then be sent to the selected prospective mate with the specifics already determined.

"Reality Show" Featuring Games

Although the primary use of the system of the present invention is for managing games for introducing people to others according to their discrete wish-list, and furthering the development of interpersonal relations, such a system can also be the basis of a televised "reality show" that broadcasts the games to an audience.

Figure 16:
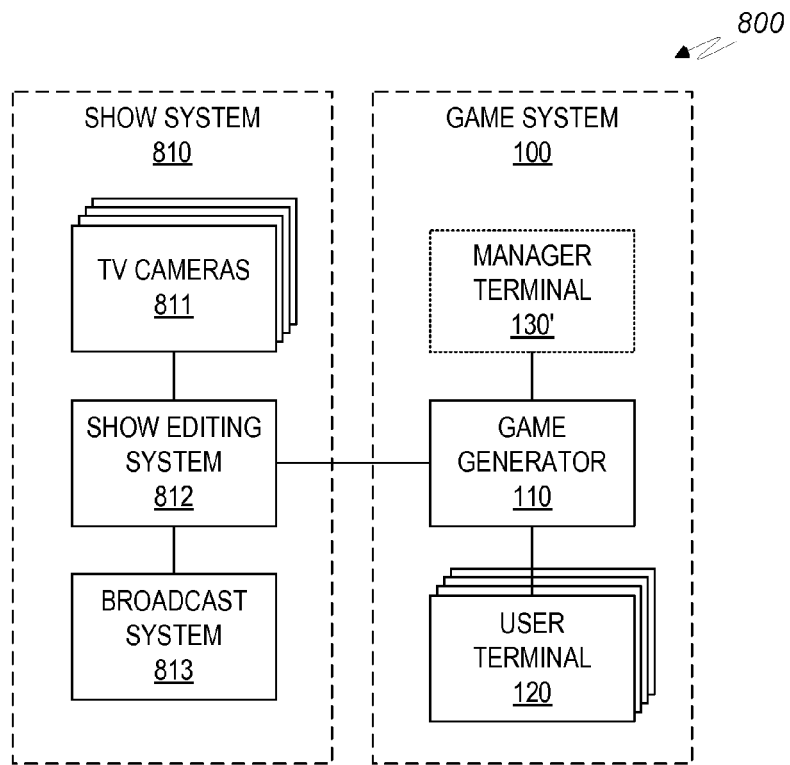
FIG. 16 is a schematic block diagram illustrating a setup for a televised reality show based on the games of the present invention.

FIG. 16 schematically illustrates a reality show setup 800, wherein system 100 of FIG. 1 cooperates with a show system 810 to implement a reality show based on the games of the present invention. Game system 100 includes game generator 110, and user terminals 120, as illustrated in FIG. 1. A manager terminal 130' can have the same functions as manager terminal 130 of FIG. 1 as described above. Alternatively, all or some of the functions of manager terminal 130 can be moved to a show editing system 812, leaving only a subset of roles to terminal 130', or even moving all manager functions to editing system 812 thus eliminating manager terminal 130' altogether. Subscribers participating in the game by using user terminals 120 are aware of, and approve of the publicity of the games including all or part of their wish-lists (which under normal circumstances are kept secret). Show system 810 is a regular TV show system, including TV cameras 811 to record the games, show editing system 812 to control and edit the show, and a broadcast system 813 to distribute the show via TV channels such as radio-frequency transmission, satellite, or cable. Show editing system 812 also interoperates with game generator 100 to retrieve wish-list details therefrom and/or undertake all or part of the roles of manager terminal 130 of FIG. 1, as described above. Show editing system 812 preferably also includes recording equipment for non-live broadcasts; it will be appreciated that recorded shows are preferable in case of a game series that spans several separate sessions, in order to hide the wish list from the participants during and between the games while revealing it to the audience.

Using a Call Router

When assignment database 150 (FIG. 2) includes virtual assignments, subscribers may need to interact electronically via personal terminals 123 (FIG. 1). However, in many situations it may be desirable to protect the contact details of subscribers from other subscribers for the initial or entire duration of the game series.

Figure 17:
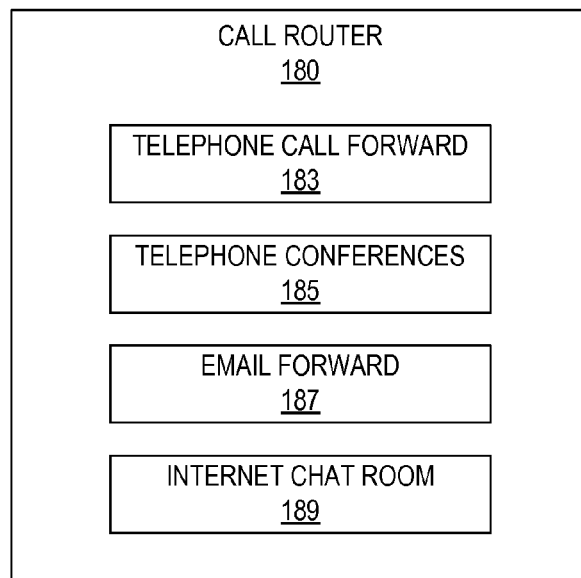
FIG. 17 is a schematic block diagram illustrating call routing techniques that can be employed for preferred embodiments of the present invention.

FIG. 17 schematically illustrates call router 180 (FIG. 2), which includes well-known and widely-used solutions to allow subscribers to communicate with one another without disclosing their telephone numbers or email addresses. A telephone call forward service 183 is used by the forum organizer to route calls from dedicated phone numbers owned by the forum organizer to selected subscribers. For example, a man whose assignment is to have a telephone discussion with a woman at a certain time, calls a forum phone number specified in the assignment, and the call is routed automatically to the assigned woman, so that none of the participants learn the telephone number of the other. A telephone conference service 185 is a common service, allowing, for example, a group of subscribers to join a group discussion without disclosing the individual telephone numbers; thus the assigned participants receive in their assignment the number of the conference service and time to make the call. An email forward service 187 is used by the forum organizer to receive, in a forum email address, a message from a subscriber, and forward only its content to the private email address of the selected addressee. An Internet chat room 189 can be established for a specific couple or group interaction, without disclosing the addresses of the participants.

It will be appreciated that the examples above represent only a sample of known technical possibilities for managing an electronic interaction without disclosing the participants' contact details.

Games Composed of Interdependent Assignments

As already described above, each individual assignment under the present invention is devised to entertain the participants, highlight their positive features, and induce mutual interest between prospective mates. Also, it has been described (for example with respect to step 552 of FIG. 12) that assignment selection preferably escalates the level of the assignment's intensity and intimacy in accordance with the stage of mutual acquaintance between the prospective mates, that can be measured, for example, by the serial number of their mutual meeting, as well as by the mutual attraction score.

Furthermore, it will be appreciated that a game can be composed of a sequence of interdependent assignments that are logically ordered not only by their intimacy and intensity levels but additionally or alternatively by their content. For example, a game can include a 'culture package' that starts with a movie, followed by a visit to the museum, the theater, the opera, and finally Yankee stadium. A couple assigned to this package may be planned by the system to execute the entire tour within, say, two weeks, before being assigned a different game. Preferably, however, the participants are not aware of the fact that each of their assignments is a part of a broader game, and are notified of each assignment separately as if it belongs to a separate standalone game. This gives each of the participants an option to change her or his mind, and by excluding their partner in their wish-list the sequence is broken with nobody noticing the discontinuity, and new prospective mates and assignments are selected and assigned as usual.

Working with Varying Assignment Databases

Assignment Database 150 of FIG. 2 has been described above as a static entity that is customized toward a specific game series of a specific forum and remains fixed during the entire game series and uniform for all participants. The game selection by processor 160 has been described however as preferably escalatory, to adapt the intensity and intimacy levels of couple assignments to the stage of mutual acquaintance.

In an alternative preferred embodiment of the present invention, the assignments available to a subscriber during a game series and ready for ranking in his or her wish list may include dynamic assignments that are personalized (adapted to the subscriber), escalatory (in a pre-programmed order for building relationships gradually) and asymmetric (such as different, complementary assignments presented to men and women). The main advantage of such dynamic allocation of selectable assignments is for couples who have already selected each other as 'the most preferred one' ('9') and the game assignments then turn to focus on building the relationship and assisting the participants in evaluating each other's personality traits.

Figure 18:
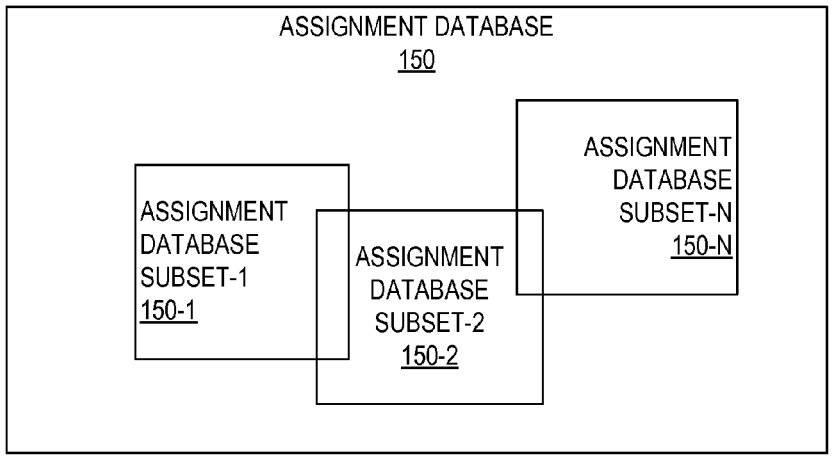
FIG. 18 is a schematic illustration of personalization of subsets of assignments for advanced couple games according to a preferred embodiment of the present invention.

FIG. 18 describes schematically how game assignment database 150 of FIG. 2 is optionally subdivided into subsets 150-1, 150-2, . . . , 150-N. Each subset represents a snapshot of the assignments presently offered to a specific subscriber. The subsets usually overlap, i.e. similar assignments may be offered simultaneously to several subscribers. Thus, assignment database 150 is actually the union of all individual subsets during the entire game series. However, effectively, only a specific subset is customized and offered to each subscriber toward a specific game session, and the remainder of the assignments from database 150 will neither be shown to the subscriber nor will it be selected by processor 160.

Figure 19:
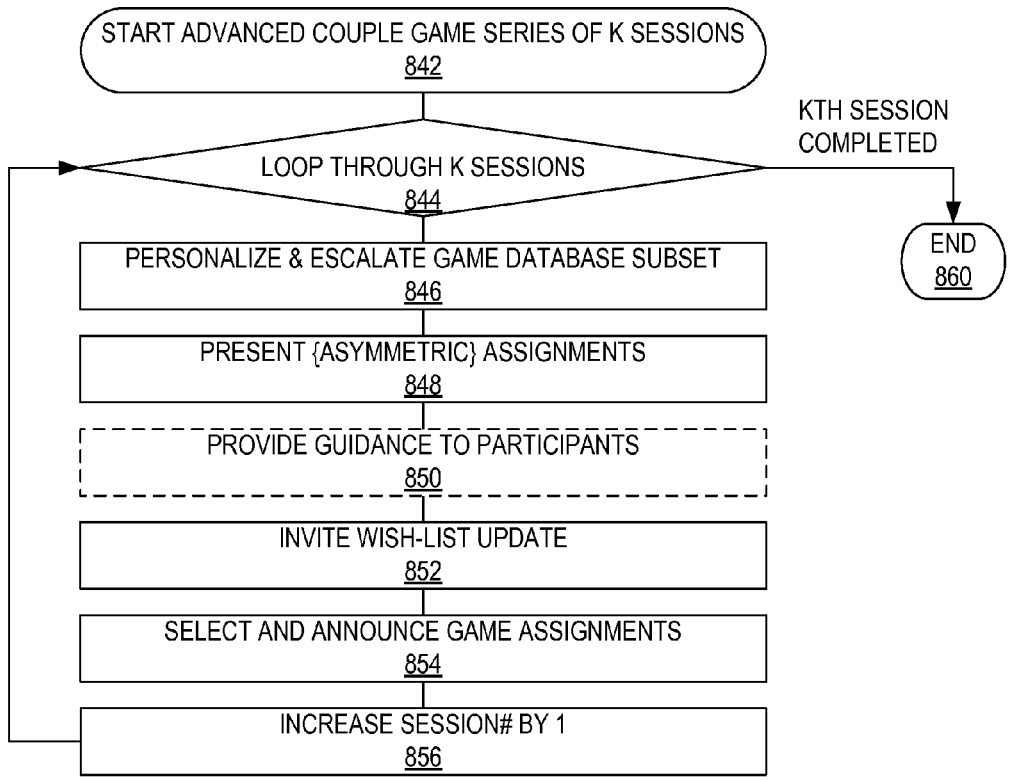
FIG. 19 is a flowchart illustrating advanced couple games according to a preferred embodiment of the present invention.

FIG. 19 describes a series of advanced couple games for a man-woman couple who have already scored each other as 'the most preferred prospective mate' (e.g. score '9'). Processor 160 then runs under program 165 (FIG. 2) to offer game assignments that are aimed at building up the relationship and exposing each other to the other person's personality traits. The procedure starts in step 842 by selecting to assign K game sessions to the couple, where K is the number of steps devised to let the participants get to know each other. Step 844 starts to loop through the K game assignments, to end up the procedure by either: completing the K assignments in step 860; mutually selecting to retire before the series completion (not shown); or having one of the participants select to downgrade the other participant through his or her wish list (not shown). In step 846 processor 160 personalizes and escalates assignments from assignment database 150 in order to customize an assignment subset 150-1 and 150-J for the participating man and woman, respectively. An example for personalized subsets are those which include concerts and exclude hiking for a couple which has already indicated that both love music and hate outdoors activities. An example for escalating subsets is offering a 'retire from the forum' assignment only to one who has selected another as 'the most preferred one', or offering a romantic, self-cooked dinner the first time only at the 10th mutual assignment. In step 848 the current respective assignment database subset is presented to each of the two participants; if appropriate, the assignments are presented in asymmetric language; for example, one of the currently-selectable assignment maybe presented to the man as 'invite the woman to a dinner you cooked', while the woman will see 'agree to be invited to a dinner he cooked'. In optional step 850, a guide from guide database 182 is issued by processor 160 via terminal 120, separately to each of the participants, to provide knowledge regarding what is the purpose of the current stage, and tips and ideas with respect to selecting and handling the offered assignments. In step 852 the two participants are invited by processor 160 to enter their updated scores to their wish list through user terminals 120; this is the opportunity of the participants also to select retirements from the forum (which will be respected by processor 160 only if both select it) or any of the participants selecting to downgrade the other, thus breaking the loop 844 (not shown); also the assignment ranks may be updated. In step 854, processor 160 weights-in the assignment ranks made by the two participants with respect to the actives assignment database subsets 150-1 and 150-J, and selects and announces the best match. After completing the assignment (not shown), the game session count is increased by 1, and the procedure moves to the next assignment in step 844.

Four Layers of Interpersonal Interaction

It will be appreciated that the system of the present invention offers at least the following four layers of interpersonal interaction: (1) participants meet one another face-to-face in a social context, and are personally familiar with each other in the games; (2) couple games give participants the opportunity to interact intensively with prospective mates; (3) couple competition games add a dimension of teamwork, mutual reliance, and interdependency; and (4) there is a group dynamics induced by the fact that participants compete among themselves for the same prospective mates; this encourages conscious decision-making, keeping scores up-to-date, and making a best effort to be attractive to desirable prospective mates.

A Variation without Assignment Ranking

The preferred embodiments described above allowed the subscriber to both score the prospective mates and rank his or her interest in assignments from assignment database 150 (FIG. 2). In this way, the subscriber affects both with whom he or she will meet, and what they will do together. However, it will be noted that some preferred embodiments of the present invention may exclude assignment ranking by the participants, and then personal wish list 145 (FIG. 4) includes prospective mate scores 145M, but assignment ranks 145A are excluded. This optional policy presumes that all assignments in assignment database 150 are acceptable by all participants, or at least that the system can decide which assignments are adequate, for example by relating to the age or hobbies from personal data record 143 of the participant, and/or by receiving input through manager terminal 130 from the forum organizer, who makes an educated assignment selection for the participants. In such a case, the assignment selection rules 171C (FIG. 5) exclude taking into account the respective assignment ranking but preferably take into account escalatory rules such as adapting the intensity and intimacy levels of the assignment to the serial number of the mutual meeting and/or to the mutual attraction score of the respective participants. Thus, the concept of assignment selection, such as in step 221 of FIG. 8, step 232 of FIG. 9, or step 411 of FIG. 13, remains meaningful even if such selection does not take into account express assignment ranking by the participants but only external rules included in assignment selection rules 171C of FIG. 5.

Comments, Additions, Variations, and Enhancements

User ideas and feedback can enrich the system and customize it. Thus, part of the user feedback entered during wish-list updates (e.g. step 234 of FIG. 9) can include ideas for new assignments as well as critique and suggestions for improving existing assignments. In return, a user who offers a new game for the forum can benefit from having an exclusive right to have this game assigned to him or her (along with the prospective mate) within the current game series.

The game assignments and game rules described above are exemplary and are brought for the purpose of demonstrating the system's operation and making the specification clear and tangible. It will be appreciated that the system of the present invention can support an ever-evolving set of game assignments and game rules.

The game program or forum organizers may designate some assignments as requiring additional subscriber approval before execution. For example, a subscriber may receive a message "you have been selected for a swim in the lake with one of your preferred prospective mates. Please confirm or reject".

Some assignments, such as dining in a restaurant or participating in a trip, may have an associated additional cost. Such additional cost and the way payment is to be made are included in the assignment details, and may require pre-approval by the subscriber.

When SMS-capable cellular telephones, two-way beepers or wireless palmtop computers are used as personal terminals 123, an abbreviated messaging protocol is preferably used, preferably accompanied by a printed guide. An exemplary printed guide includes a legend with a two digit code in the range 01-30 assigned for each of the participants, another two-digit code in the range 31-99 assigned for each of the available assignments, and instructions to send short messages such as '219' to update the wish list of the sender by scoring participant '21' as 'the most preferred one' ('9'), or sending a message '550' to exclude assignment '55' by ranking it '0'. In the case of the paradigm of FIG. 4C, where an assignment is ranked with respect to a prospective mate, a message such as '57169' may express the sender's ranking '9' assignment '57' with respect to prospective mate '16'. In larger forums and/or larger game variety, a three-digit coding scheme can be employed for identifying prospective mates or assignments. Such coded messages are addressed to game processor 160, which identifies and authenticates the sender through the respective caller ID and/or through additional ID digits that the user adds to the message, and then updates the respective wish list accordingly. It would be noted that instead of SMS, which is a digital messaging format, any other communication method can be used, such as DTMF dial tones that can be applied by telephone users for entering abbreviated messages as described above. Additionally or alternatively, known voice-recognition technologies can be used to receive such messages using human voice; also the messages sent by game processor 160 can be in the form of synthesized voice messages.

Advantages Over, and Cooperation with, Existing Systems

The present invention offers many advantageous aspects that are not covered by existing systems. Non-limiting examples of such advantages include:
  nurturing the mutual evolution of interest and affection through a carefully-crafted series of games;
  games involve activities selected discreetly by the participants to highlight their personal qualities and/or examine the qualities of the prospective mate;
  adapting the level of intensity and intimacy of games in accordance to the stage of relationships and the mutual attraction score;
  couples are assigned a mutual assignment, where both the prospective mate selection and assignment selection reflect the preferences of the participants, but wherein a random factor masks these expressed preferences to protect the participants' privacy;
  establishing opportunities for a second impression and second chance by generating unexpected meeting opportunities that highlight the favorable qualities of the participants;
  initiating single and group games to entertain participants and acquaint them with each other;
  involving all forum members in social interactions with others even if they were not initially chosen as a preferred prospective mate by others;
  developing mutual acquaintance and attraction through prescribed, escalating stages of interaction.

However, existing systems can facilitate preparations toward the operation of the present invention:

Existing singles' organizations, clubs, meeting places and Internet singles' forums can provide communities 602 of FIG. 14, from which forums 603 can be derived to participate in games in accordance to the present invention.

Existing matchmaking algorithms, profiling knowledge and computer programs can assist community organizers in selecting compatible subscribers to derive forums 603 from communities 602.

Brief introductory speed dates among all forum members of the opposite sex could precede the games of the present invention, in order to provide the basis for the initial wish-list entries, as described above with respect to step 406 of FIG. 13.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A computerized method for generating interpersonal activities for subscribers, the method comprising:
   presenting, for access by user terminals, an assignment database that includes assignments, an assignment being a specification of an interpersonal activity to be performed by a subscriber, in front of or cooperatively in combination with other subscribers;
   receiving, by a processor, from a user terminal of each subscriber of a plurality of subscribers, a ranking of said each subscriber's level of interest in having each assignment of a plurality of assignments from said assignment database;
   subsequent to said receiving: picking, by a processor, from a subscriber database, a first subscriber and a second subscriber for an interpersonal activity;
   subsequent to said picking: assigning, by a processor, from the assignment database, in proportionate response to said rankings received from said first subscriber and said second subscriber:
     a first assignment for said first subscriber, and
     a second assignment, that matches said first assignment, for said second subscriber;
   providing to a user terminal of said first subscriber: identification of said second subscriber and said first assignment; and
   providing to a user terminal of said second subscriber: identification of said first subscriber and said second assignment.

2. The method of claim 1, wherein said first assignment and said second assignment are identical.

3. The method of claim 1, wherein said first assignment and said second assignment are complementary.

4. The method of claim 1, wherein said first assignment and said second assignment are face-to-face assignments.

5. The method of claim 1, wherein said first assignment and said second assignment are virtual assignments.

6. The method of claim 1, wherein:
   assignments of said assignment database have a qualification by at least one of a level of intensity or a level of intimacy;
   each instance of two subscribers being picked is counted by a number respective to said two subscribers; and
   said first assignment and said second assignment are assigned in accordance also with comparing said qualification with said number respective to said first subscriber and second subscriber.

7. The method of claim 1, further comprising drawing a random number by a processor, and said first assignment and said second assignment are assigned in accordance also with said random number.

8. An apparatus for generating interpersonal activities for subscribers, the apparatus comprising:
   a subscriber database that includes a personal record for each subscriber of a plurality of subscribers;
   an assignment database that includes a plurality of assignments, an assignment being a specification of an interpersonal activity to be performed by a subscriber, in front of or cooperatively in combination with other subscribers; and
   a processor adapted to:
     receive, from a user terminal of each subscriber of the plurality of subscribers, a ranking of said each subscriber's level of interest in having each assignment of a plurality of assignments from said assignment database;
     subsequent to said receive: pick from said subscriber database a first subscriber and a second subscriber for an interpersonal activity;
     subsequent to said pick: assign from said assignment database, in proportionate response to said rankings received from said first subscriber and said second subscriber:
       a first assignment for said first subscriber, and
       a second assignment, that matches said first assignment, for said second subscriber;
     provide to a user terminal of said first subscriber: identification of said second subscriber and said first assignment; and
     provide to a user terminal of said second subscriber: identification of said first subscriber and said second assignment.

9. The apparatus of claim 8, wherein said first assignment and said second assignment are identical.

10. The apparatus of claim 8, wherein said first assignment and said second assignment are complementary.

11. The apparatus of claim 8, wherein said first assignment and said second assignment are face-to-face assignments.

12. The apparatus of claim 8, wherein said first assignment and said second assignment are virtual assignments.

13. The apparatus of claim 8, wherein:
   assignments of said assignment database have a qualification by at least one of a level of intensity or a level of intimacy;
   each instance of two subscribers being picked is counted by a number respective to said two subscribers; and
   said assign is in accordance also with comparing said qualification with said number respective to said first subscriber and second subscriber.

14. The apparatus of claim 8, wherein said processor is further adapted to draw a random number, and said assign is also in accordance with said random number.

15. A computerized method for generating interpersonal activities for subscribers, the method comprising:
   presenting, for access by user terminals, an assignment database that includes assignments, an assignment being a specification of an interpersonal activity to be performed by a subscriber, in front of or cooperatively in combination with other subscribers;

receiving, by a processor, from a user terminal of each subscriber of a plurality of subscribers, a ranking of said each subscriber's level of interest in having each assignment of a plurality of assignments from said assignment database;

providing, by a processor, to a user terminal of a first subscriber:
- identification of a second subscriber that has been picked by a processor, subsequent to said receiving, as a partner for said first subscriber, and
- a first assignment from said assignment database; and providing, by a processor, to a user terminal of said second subscriber:
- identification of said first subscriber, and
- a second assignment from said assignment database;

wherein said first assignment and said second assignment are matched assignments that have been assigned by a processor, subsequent to said receiving and prior to said providing, in proportionate response to said rankings received from said first subscriber and said second subscriber.

16. The method of claim 15, wherein said first assignment and said second assignment are identical.

17. The method of claim 15, wherein said first assignment and said second assignment are complementary.

18. The method of claim 15, wherein said first assignment and said second assignment are face-to-face assignments.

19. The method of claim 15, wherein said first assignment and said second assignment are virtual assignments.

20. The method of claim 15, wherein:
- assignments of said assignment database have a qualification by at least one of a level of intensity or a level of intimacy;
- each instance of two subscribers being picked is counted by a number respective to said two subscribers; and
- said first assignment and said second assignment assigned in accordance also with comparing said qualification with said number respective to said first subscriber and second subscriber.

* * * * *